(12) United States Patent
Xu et al.

(10) Patent No.: US 11,202,277 B2
(45) Date of Patent: Dec. 14, 2021

(54) OVERBOOKING HANDLING FOR MULTIPLE TRANSCEIVER NODES

(71) Applicant: QUALCOMM Incorporated, San Diego, CA (US)

(72) Inventors: Huilin Xu, San Diego, CA (US); Wanshi Chen, San Diego, CA (US); Heechoon Lee, San Diego, CA (US); Alexandros Manolakos, San Diego, CA (US); Mostafa Khoshnevisan, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 57 days.

(21) Appl. No.: 16/510,705

(22) Filed: Jul. 12, 2019

(65) Prior Publication Data
US 2020/0029305 A1    Jan. 23, 2020

(30) Foreign Application Priority Data

Jul. 23, 2018 (GR) .............................. 20180100337

(51) Int. Cl.
*H04W 72/02* (2009.01)
*H04W 72/04* (2009.01)
(Continued)

(52) U.S. Cl.
CPC ........... *H04W 72/02* (2013.01); *H04L 1/0038* (2013.01); *H04W 72/048* (2013.01); *H04W 72/0446* (2013.01); *H04W 76/11* (2018.02)

(58) Field of Classification Search
CPC ...... H04W 72/02; H04W 76/11; H04L 1/0038
See application file for complete search history.

(56) References Cited

U.S. PATENT DOCUMENTS

2013/0303179 A1* 11/2013 Jitsukawa ......... H04W 72/1289
455/450
2014/0105272 A1   4/2014 Bulusu et al.
(Continued)

FOREIGN PATENT DOCUMENTS

WO   WO-2013125873 A1 *  8/2013  ............ H04W 56/00
WO   WO-2015113289 A1 *  8/2015  ............ H04W 76/27
(Continued)

OTHER PUBLICATIONS

CATT: "Remaining Issues on PDCCH Search Space", 3GPP Draft; R1-1803751, 3rd Generation Partnership Project (3GPP), Mobile Competence Centre; 650, Route Des Lucioles; F-06921, Sophia-Antipolis Cedex; France, vol. RAN WG1, No. Sanya, China; Apr. 16, 2018-Apr. 20, 2018, Apr. 15, 2018 (Apr. 15, 2018), 8 pages, XPB51426046, Retrieved from the Internet: URL:http://www.3gpp.org/ftp/Meetings%5F3GPP%5FSYNC/RAN1/Docs/.
(Continued)

*Primary Examiner* — Deepa Belur
(74) *Attorney, Agent, or Firm* — Terry Tsai

(57) ABSTRACT

Methods, systems, and devices for wireless communications are described. A user equipment (UE) may identify a first plurality of control resources associated with a first transceiver node and a second plurality of control resources associated with a second transceiver node. The UE may select, based at least in part on a decoding limit for the UE, a decoding configuration to use for decoding one or more control resources from the first plurality of control resources and one or more resources from the second plurality of control resources. The UE may decode control signals received over control resources from the first plurality of control resources and the second plurality of control resources according to the decoding configuration.

22 Claims, 17 Drawing Sheets

(51) Int. Cl.
    *H04L 1/00*     (2006.01)
    *H04W 76/11*     (2018.01)

(56)              References Cited

U.S. PATENT DOCUMENTS

| | | |
|---|---|---|
| 2014/0119213 A1 | 5/2014 | Devarasetty |
| 2014/0211717 A1* | 7/2014 | Jitsukawa ............. H04W 28/16 370/329 |
| 2017/0237524 A1* | 8/2017 | Ahn ...................... H04L 1/1835 714/799 |
| 2018/0007670 A1 | 1/2018 | Bala et al. |
| 2018/0159555 A1 | 6/2018 | Ryabinin et al. |
| 2018/0199315 A1* | 7/2018 | Hong .................... H04W 88/10 |
| 2018/0213584 A1* | 7/2018 | Yang ..................... H04W 16/14 |
| 2020/0163062 A1* | 5/2020 | Takeda .................. H04L 5/0053 |

FOREIGN PATENT DOCUMENTS

| | | |
|---|---|---|
| WO | WO-2017001025 A1 | 1/2017 |
| WO | WO-2017084514 A1 | 5/2017 |
| WO | WO-2019028925 A1 * | 2/2019 .......... H04W 72/044 |

OTHER PUBLICATIONS

Partial International Search Report—PCT/US2019/041850—ISA/EPO—dated Oct. 15, 2019.
International Search Report and Written Opinion—PCT/US2019/041850—ISA/EPO—dated Dec. 6, 2019.

\* cited by examiner

OVERBOOKING HANDLING FOR MULTIPLE TRANSCEIVER NODES

CROSS REFERENCE

The present application for patent claims the benefit of Greece Provisional Patent Application No. 20180100337 by XU, et al., entitled "OVERBOOKING HANDLING FOR MULTIPLE TRANSCEIVER NODES," filed Jul. 23, 2018, assigned to the assignee hereof, and expressly incorporated herein.

BACKGROUND

The following relates generally to wireless communications, and more specifically to overbooking handling for multiple transceiver nodes.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some cases, a UE may communicate with two or more transceiver nodes (or transmission/reception points (TRPs), base stations, and the like) over time/frequency resources. For example, the UE may receive control information from the transceiver nodes using various control resources configured (e.g., booked) for the UE. In some cases, each of the transceiver nodes may configure a plurality of control resources for the UE, which may exceed the decoding limit of the UE, e.g., may require an excessive number of blind decoding attempts and/or exceed the number of control channel elements that the UE can use for channel estimation. In one example, the UE may reach its decoding limit decoding control information communicated on configured control resources from one transceiver node, thus preventing the UE from decoding any control information from the other transceiver node(s). Thus, conventional overbooking handling techniques may result in a loss and/or degradation of communications between the UE and the two or more transceiver nodes.

SUMMARY

The described techniques relate to improved methods, systems, devices, and apparatuses that support overbooking handling for multiple transceiver nodes. Generally, the described techniques provide a mechanism for a user equipment (UE) to handle the situation where control resources are configured for the UE corresponding to multiple transceiver nodes, which generally exceeds the decoding limit for the UE. For example, the UE may be communicating, or at least receiving, information from two or more transceiver nodes (e.g., transmission/reception points (TRPs), base stations, etc.). Each transceiver node may configure a plurality of control resources for the UE to use for receiving control information. In some examples, each control resource may refer to a search space set. The network node may assign a number (e.g., assign an identifier (ID)) to each control resource in their respective group or plurality of control resources to support a decoding configuration of the UE. The UE may determine or otherwise identify the plurality of control resources corresponding to each associated transceiver node and select, based on the decoding limit of the UE, a decoding configuration to use. In some aspects, the decoding configuration may provide a mechanism where the UE is capable of receiving/decoding control signals received over control resources corresponding to each of the one or more transceiver nodes. Accordingly, the UE may receive and decode the control signals received over control resources corresponding to each associated transceiver node according to the decoding configuration.

A method of wireless communication at a UE is described. The method may include identifying a first set of control resources associated with a first transceiver node and a second set of control resources associated with a second transceiver node, selecting, based on a decoding limit for the UE, a decoding configuration to use for decoding one or more control resources from the first set of control resources and one or more resources from the second set of control resources, and decoding received control signals received over control resources from the first set of control resources and the second set of control resources according to the decoding configuration.

An apparatus for wireless communication at a UE is described. The apparatus may include a processor, memory in electronic communication with the processor, and instructions stored in the memory. The instructions may be executable by the processor to cause the apparatus to identify a first set of control resources associated with a first transceiver node and a second set of control resources associated with a second transceiver node, select, based on a decoding limit for the UE, a decoding configuration to use for decoding one or more control resources from the first set of control resources and one or more resources from the second set of control resources, and decode received control signals received over control resources from the first set of control resources and the second set of control resources according to the decoding configuration.

Another apparatus for wireless communication at a UE is described. The apparatus may include means for identifying a first set of control resources associated with a first transceiver node and a second set of control resources associated with a second transceiver node, selecting, based on a decoding limit for the UE, a decoding configuration to use for decoding one or more control resources from the first set of control resources and one or more resources from the second set of control resources, and decoding received control signals received over control resources from the first set of control resources and the second set of control resources according to the decoding configuration.

A non-transitory computer-readable medium storing code for wireless communication at a UE is described. The code may include instructions executable by a processor to identify a first set of control resources associated with a first transceiver node and a second set of control resources associated with a second transceiver node, select, based on a decoding limit for the UE, a decoding configuration to use for decoding one or more control resources from the first set of control resources and one or more resources from the second set of control resources, and decode received control signals received over control resources from the first set of control resources and the second set of control resources according to the decoding configuration.

In some examples of the method, apparatuses, and non-transitory computer-readable medium described herein, the decoding configuration may include operations, features, means, or instructions for selecting to decode, in successive order based on an identifier associated with each control resource, first control signals received over a first control resource from the first set of control resources before second control signals received over a second control resource from the second set of control resources.

In some examples of the method, apparatuses, and non-transitory computer-readable medium described herein, the control resources in the first set of control resources and the control resources in the second set of control resources include alternating identifiers for each control resource.

In some examples of the method, apparatuses, and non-transitory computer-readable medium described herein, the decoding configuration may include operations, features, means, or instructions for selecting to decode first control signals received over a first control resource of the first set of control resources, selecting to decode second control signals received over a second control resource of the second set of control resources and repeating, based on the decoding limit, the decoding of control signals received over control resources from the first set of control resources followed by the decoding of control signals received over control resources from the second set of control resources.

Some examples of the method, apparatuses, and non-transitory computer-readable medium described herein may further include operations, features, means, or instructions for determining a first identifier associated with the first transceiver node and a second identifier associated with the second transceiver node, where decoding the first control signals and the second control signals may be based on the first identifier and the second identifier.

In some examples of the method, apparatuses, and non-transitory computer-readable medium described herein, the decoding configuration may include operations, features, means, or instructions for identifying a number of transceiver nodes communicating control signals to the UE, dividing, based on the decoding limit, the decoding limit between the transceiver nodes and selecting, based on the dividing, to decode control signals received over control resources corresponding to each transceiver node. In some examples of the method, apparatuses, and non-transitory computer-readable medium described herein, the decoding limit of the UE may include a first decoding limit associated with the first transceiver node and a second decoding limit associated with the second transceiver node. In some examples of the method, apparatuses, and non-transitory computer-readable medium described herein, summation of the first decoding limit and the second decoding limit may be no larger than the decoding limit for the UE when it communicates with a single transceiver node.

Some examples of the method, apparatuses, and non-transitory computer-readable medium described herein may further include operations, features, means, or instructions for receiving a signal from the first transceiver node indicating a first identifier for the first transceiver node and receiving a signal from the second transceiver node indicating a second identifier for the second transceiver node.

Some examples of the method, apparatuses, and non-transitory computer-readable medium described herein may further include operations, features, means, or instructions for receiving a signal from a single transceiver node indicating a first identifier for the first transceiver node and a second identifier for the second transceiver node.

Some examples of the method, apparatuses, and non-transitory computer-readable medium described herein may further include operations, features, means, or instructions for receiving a signal from the first transceiver node indicating identifiers for the control resources in the first set of control resources and receiving a signal from the second transceiver node indicating identifiers for the control resources in the second set of control resources.

Some examples of the method, apparatuses, and non-transitory computer-readable medium described herein may further include operations, features, means, or instructions for receiving a signal from a single transceiver node indicating identifiers for the control resources in the first set of control resources and identifiers for the control resources in the second set of control resources.

In some examples of the method, apparatuses, and non-transitory computer-readable medium described herein, the decoding limit may be based on a number of blind decoding limits per slot or a number of CCEs for channel estimation per scheduling unit. The scheduling unit may be defined as a slot or a span containing up to three consecutive symbols where PDCCH is monitored in at least one of the consecutive symbols.

In some examples of the method, apparatuses, and non-transitory computer-readable medium described herein, the first transceiver node includes a first TRP and the second transceiver node includes a second TRP.

In some examples of the method, apparatuses, and non-transitory computer-readable medium described herein, each control resource in the first set of control resources and the second set of control resources includes a search space set.

A method of wireless communication at a transceiver node is described. The method may include identifying a set of control resources configured for a UE, configuring an identifier for each control resource in the set of resources based on a number of transceiver nodes transmitting control resources to the UE, and transmitting a set of control signals to the UE using the control resources in the set of control resources, each control resource transmitted in an order corresponding to the identifier.

An apparatus for wireless communication at a transceiver node is described. The apparatus may include a processor, memory in electronic communication with the processor, and instructions stored in the memory. The instructions may be executable by the processor to cause the apparatus to identify a set of control resources configured for a UE, configure an identifier for each control resource in the set of resources based on a number of transceiver nodes transmitting control resources to the UE, and transmit a set of control signals to the UE using the control resources in the set of control resources, each control resource transmitted in an order corresponding to the identifier.

Another apparatus for wireless communication at a transceiver node is described. The apparatus may include means for identifying a set of control resources configured for a UE, configuring an identifier for each control resource in the set of resources based on a number of transceiver nodes transmitting control resources to the UE, and transmitting a set of control signals to the UE using the control resources in the set of control resources, each control resource transmitted in an order corresponding to the identifier.

A non-transitory computer-readable medium storing code for wireless communication at a transceiver node is described. The code may include instructions executable by a processor to identify a set of control resources configured for a UE, configure an identifier for each control resource in the set of resources based on a number of transceiver nodes transmitting control resources to the UE, and transmit a set of control signals to the UE using the control resources in the set of control resources, each control resource transmitted in an order corresponding to the identifier.

Some examples of the method, apparatuses, and non-transitory computer-readable medium described herein may further include operations, features, means, or instructions for configuring the identifier for each control resource using a non-consecutive order.

Some examples of the method, apparatuses, and non-transitory computer-readable medium described herein may further include operations, features, means, or instructions for configuring the identifier for each control resource using a consecutive order.

Some examples of the method, apparatuses, and non-transitory computer-readable medium described herein may further include operations, features, means, or instructions for configuring the identifier for each control resource based on an identifier associated with the transceiver node.

Some examples of the method, apparatuses, and non-transitory computer-readable medium described herein may further include operations, features, means, or instructions for coordinating with at least one of an adjacent transceiver node of the number of transceiver nodes, a network controller entity, or a combination thereof.

DETAILED DESCRIPTION

Figure 1:
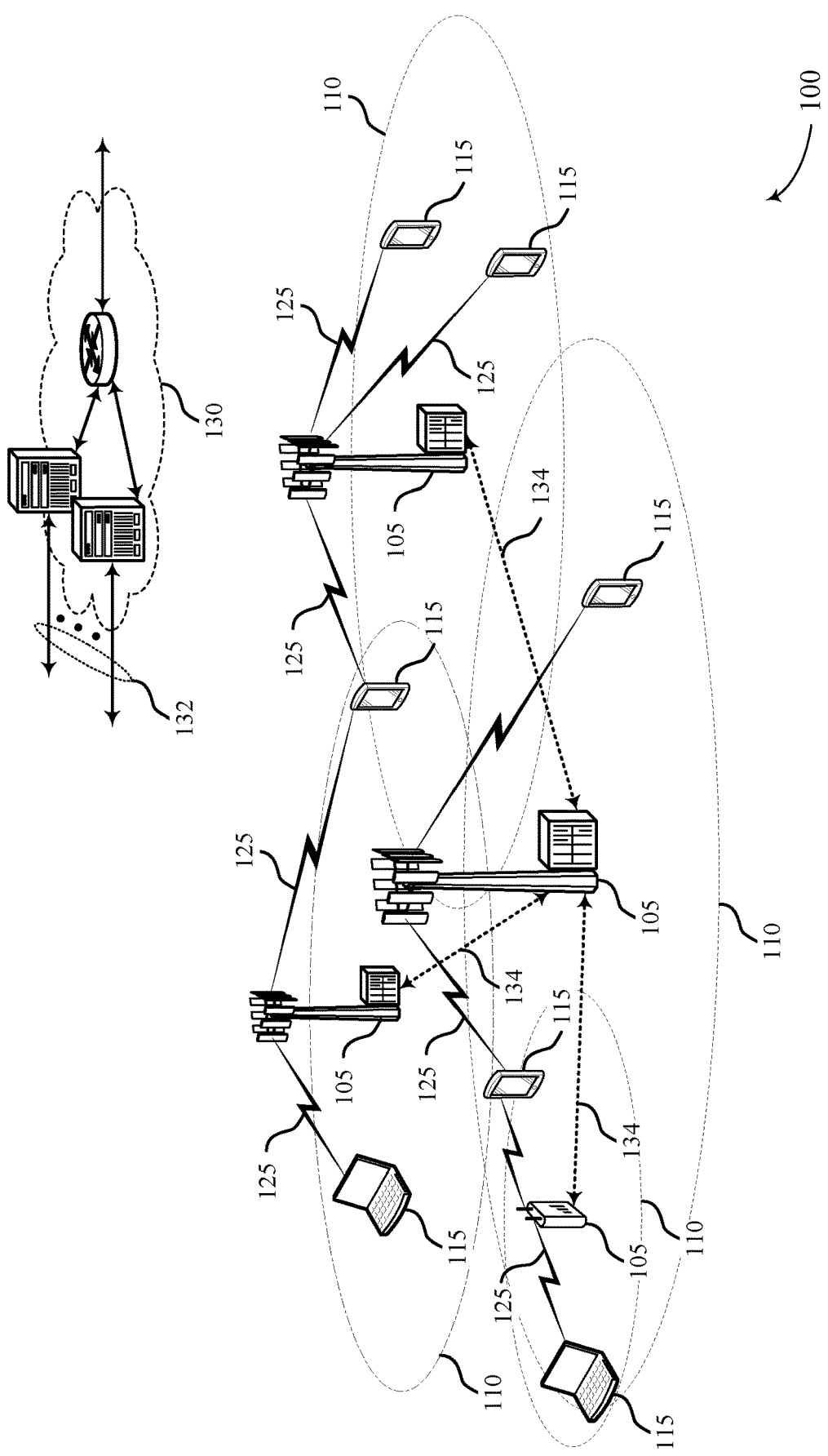
FIG. 1 illustrates an example of a system for wireless communications that supports overbooking handling for multiple transceiver nodes in accordance with aspects of the present disclosure.

A user equipment (UE) may typically communicate with a plurality of transceiver nodes. A transceiver node may generally refer to a base station, a transmission/reception point (TRP), and the like. In some examples, TRPs may be associated with one or more base stations, and vice versa. Each transceiver node may configure resources for communicating control information to the UE. The UE, however, may be configured with a decoding limit that limits the number of control resources that the UE can utilize. For example, the UE may be limited in the number of blind decoding (BD) attempts that the UE can perform during a slot. In another example, the UE may be limited in the number of control channel elements (CCEs) that the UE can use for channel estimations during the slot. When the transceiver nodes configure more control resources than the UE can utilize during a particular slot, this may result in overbooking for the UE. While overbooking may simplify network scheduling with minimal complexity from the network's perspective, the conventional techniques for the UE to handle such overbooking may be inefficient and/or ineffective. For example, the UE may utilize control resources from one transceiver node, but bump up against its decoding limit when it comes time to utilize control resources from a second transceiver node. This may result in the UE not being able to perform channel estimation, receive control information, and the like, from the second transceiver node during the slot.

Aspects of the disclosure are initially described in the context of a wireless communications system. Aspects of the described techniques generally provide a mechanism by which a UE can efficiently and effectively handle an overbooking situation where more control resources are configured for the UE than the UE is capable of utilizing. For example, a plurality of control resources may be configured for the UE for each transceiver node. In some aspects, each control resource in the plurality of control resources may be associated with control signals, e.g., physical downlink control channel (PDCCH) signals, which may include a search space set. The UE may identify the plurality of control resources for the different transceiver nodes and, based on its decoding limit, may select a decoding configuration that supports aspects of the described techniques. In some aspects, the decoding configuration may include or otherwise be based on an identifier (ID) for each control resource of the plurality of control resources configured by the network for the respective transceiver node. Additionally or alternatively, the decoding configuration may include or otherwise be based on an ID for each transceiver node. Generally, the decoding configuration may provide a mechanism by which the UE utilizes, e.g., in a balanced and effective manner, control resources corresponding to each transceiver node that it is associated with. Accordingly, the UE may decode control signals received over control resources corresponding to each associated transceiver node according to the decoding configuration.

In some aspects, the decoding configuration may also be based on control resource IDs configured by the network to support aspects of the described techniques. As one example, the network may configure each transceiver node to use alternating IDs for their respective control resources. For example, the network may configure the IDs for each transceiver node for its associated control resources based on how many transceiver nodes are transmitting control resources to the UE. As another example, the IDs for the transceiver nodes may be configured such that the UE is able to decode control signals received over control resources corresponding to each associated transceiver node. For example, the UE may consider both the control resource ID and the transceiver node ID when decoding the control signals received over control resources. In yet another example, the UE may split its decoding limit amongst associated transceiver nodes.

Aspects of the disclosure are further illustrated by and described with reference to apparatus diagrams, system diagrams, and flowcharts that relate to overbooking handling for multiple transceiver nodes.

FIG. 1 illustrates an example of a wireless communications system 100 that supports overbooking handling for multiple transceiver nodes in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a TRP. In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some aspects, a UE 115 may identify a first plurality of control resources associated with a first transceiver node and a second plurality of control resources associated with a second transceiver node. The UE 115 may select, based at least in part on a decoding limit for the UE 115, a decoding configuration to use for decoding one or more control signals received over control resources from the first plurality of control resources and one or more control signals received over control resources from the second plurality of control resources. The UE 115 may decode control signals received over control resources from the first plurality of control resources and the second plurality of control resources according to the decoding configuration.

In some aspects, a base station 105 may identify a plurality of control resources configured for a UE 115. The base station 105 may configure an identifier for each control resource in the plurality of resources based at least in part on a number of transceiver nodes transmitting control resources to the UE 115. The base station 105 may transmit a plurality of control signals to the UE 115 using the control resources in the plurality of control resources, each control resource transmitted in an order corresponding to the identifier.

Figure 2:
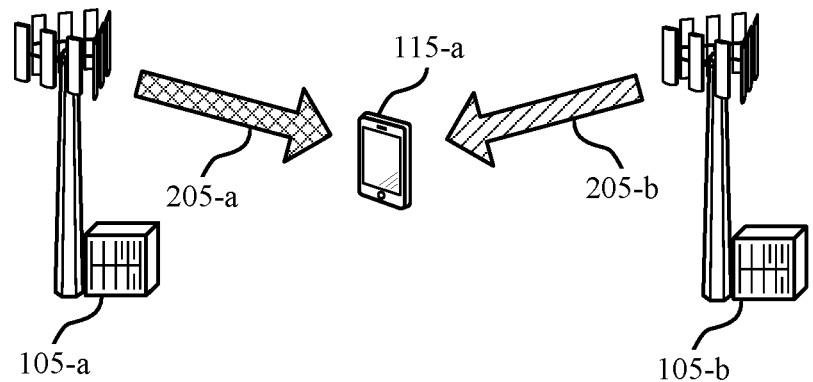
FIG. 2 illustrates an example of a wireless communication system that supports overbooking handling for multiple transceiver nodes in accordance with aspects of the present disclosure.

FIG. 2 illustrates an example of a wireless communication system 200 that supports overbooking handling for multiple transceiver nodes in accordance with aspects of the present disclosure. In some examples, wireless communication system 200 may implement aspects of wireless communication system 100. Wireless communication system 200 may include a plurality of transceiver nodes 105 (with two transceiver nodes, 105-a and 105-b, being shown by way of example only) and UE 115-a, which may be examples of the corresponding devices described herein.

In some aspects, each transceiver node 105 may be an example of a base station, a TRP, an AP, and the like. In some examples, a base station may monitor, manage, control, or otherwise be associated with multiple TRPs. In some examples, a base station may monitor, manage, control, or otherwise be associated with a single TRP. In some examples, such as in a carrier aggregation scenario, one transceiver node 105 may be considered a serving transceiver node and the other transceiver node(s) 105 may be considered secondary transceiver node(s).

In some aspects, the network may allocate or otherwise configure a plurality of control resources for each transceiver node 105 for UE 115-a. In some aspects, each control resource may include PDCCH candidates, such as a search space set, which may also be referred to as a SS set. Generally, a SS set may include a basic unit for PDCCH configuration that provides information such as on which symbols in a slot PDCCH candidates are transmitted, how many PDCCH candidates can be transmitted in these symbols, which CCEs are used to carry PDCCH candidates, and the like. Generally, the control resources may be used to communicate control information between the respective transceiver node 105 and UE 115-a and/or used to perform channel estimations by UE 115-a.

In some examples, the network may collectively overbook control resources for UE 115-a. Overbooking may refer to the network, e.g., via multiple transceiver nodes 105, configuring PDCCH candidates for UE 115-a that results in a number of required BDs or a number of CCEs used for channel estimation exceeding the corresponding decoding limit of UE 115-a. For example, two PDCCH processing limits may be configured for UE 115-a. The first may include a maximum number of BDs that UE 115-a may perform per slot. The second may include a maximum number of CCEs that UE 115-a uses to perform channel estimation per slot. The decoding limit of UE 115-a may refer to either the BD limit, the CCE limit, or a combination of the BD limit and the CCE limit. In some aspects, UE 115-a may only decode a portion of configured PDCCH candidates (e.g., control signals received over control resources) for which neither the number of required BDs nor the number of CCEs used for channel estimation exceeds the corresponding decoding limit in the slot. Overbooking is useful because it makes network scheduling of multiple PDCCH configurations more efficient with a manageable complexity.

However, conventional overbooking handling techniques are inefficient, and often ineffective, resulting in wasted resources, excessive power consumption at UE 115-a, and/or a loss of communication between UE 115-a and one or more of the associated transceiver nodes 105. In some aspects, the overbooking may not be allowed for a common search space (CSS), e.g., neither the total number of required BDs nor the total number of CCEs used for channel estimation exceeds the corresponding decoding limit for all configured CSS sets in the slot. Accordingly, in conventional techniques the first step of overbooking handling is for UE 115-a to count BD and CCE numbers of all CSS sets configured in the slot and remove them from the corresponding BD and/or CCE limit, e.g., the decoding limit of UE 115-a.

However, for each configured UE-specific search space (USS) set, from the one with the lowest ID to the one with the highest ID, the UE 115-a counts the total number of BDs and CCEs for decoding this USS set and all SS sets (including CSS and USS sets) that have been counted and compares this with the corresponding BD and CCE limit, e.g., the decoding limit. If PDCCH candidates of a USS set cannot be fully decoded without exceeding either limit, PDCCH candidates in this USS set and in all subsequent USS sets are not decoded. Thus, conventional overbooking handling prioritizes PDCCH candidates of a lower ID SS set over PDCCH candidates of a higher ID SS set.

In one non-limiting example of such conventional techniques, UE 115-a may be configured with four USS sets in the slot, where decoding of PDCCH candidates of each USS set consumes eight BDs. After PDCCH candidates of CSS sets are counted, the remaining budget of BD is 20 in the slot. According to conventional overbooking handling based on BD limit, only two USS sets having the two lowest USS set IDs are processed. If the third USS set is also processed, the number of BDs is 24 which is larger than 20, and therefore exceeds the decoding limit of UE 115-a. In some aspects, the decoding limit may not include the CCE number of all configured SS sets. In other examples, the decoding limit may include both the BD and the CCE limits being satisfied by SS sets processed by UE 115-a. In some examples, such as in a mmW network, each SS set may be associated with a single beam and UE 115-a can communicate with one transceiver node 105 only through one beam at a time, each decoded SS set can only be associated with a single transceiver node 105.

Aspects of the disclosure provide various techniques that improve overbooking handling. Broadly, the described techniques generally ensure that UE 115-a allocates its decoding limit in such a manner that ensures UE 115-a is able to decode control signals received over control resources corresponding to each associated transceiver node 105. The described techniques may be based on an ID of configured control resources, an ID associated with each transceiver node 105, and/or based on the number of transceiver nodes 105 that configure control resources for UE 115-a.

For example, the network may allocate or otherwise configure the transceiver nodes 105 with a plurality of control resources 205 (e.g., a first plurality of control resources 205-a for transceiver node 105-a and a second plurality of control resources 205-b for transceiver node 105-b) for UE 115-a. Each transceiver node 105 may be able to transmit control signals corresponding to this transceiver node 105 (e.g., PDCCH information) to UE 115-a on a corresponding plurality of control resources 205. In some examples, a transceiver node 105 may be able to transmit control signals associated with another transceiver node 105. In some aspects, each control resource 205 configured by the network for the corresponding transceiver node 105 may have an associated ID. The network of the transceiver nodes 105 may configure UE 115-a with multiple control resource sets (e.g., plurality of control resources) for each serving cell per slot.

In some aspects, UE 115-a may identify or otherwise select a decoding configuration to use for decoding the control signals received over control resources 205. Broadly, the decoding configuration may use a variety of techniques, either alone or in any combination, to ensure that UE 115-a decodes some or all of the control signals received over control resources 205 corresponding to transceiver nodes 105-a and 105-b. Although two transceiver nodes 105 are illustrated in FIG. 2, it is to be understood that the describe techniques may be utilized for any number of transceiver nodes associated with UE 115-a. Moreover, it is also to be understood that in some examples a transceiver node 105 (e.g., transceiver node 105-a) may be configured by the network to transmit control signals to UE 115-a using control resources associated with another transceiver node (e.g., transceiver node 105-b), or vice versa.

In one example, the decoding configuration may be based on an ID associated with each configured control resource 205. For example, the network (e.g., function(s) of the core network, base station(s) associated with the transceiver nodes 105, etc.) may control numbering (e.g., the IDs) of the control resources 205 in the first plurality of control resources 205-a for transceiver node 105-a and the second plurality of control resources 205-b for transceiver node 105-b such that UE 115-a utilizes aspects of conventional overbooking handling techniques, e.g., based on the lowest ID for each control resource 205. For example, the network (e.g., via either transceiver node 105) may use consecutive numbering for the plurality of control resources 205 corresponding to each transceiver node 105. The consecutive numbering may include control resources 205-a corresponding to transceiver node 105-a having IDs of 0, 2, 4, 6, etc., and control resources 205-b corresponding to transceiver node 105-b having IDs of 1, 3, 5, 7, etc., e.g., alternating IDs. Accordingly, the decoding configuration selected by UE 115-a may use the conventional techniques (e.g., starting with the lowest ID) to determine that UE 115-a selects to decode control signals received over control resource 205 (ID 0) corresponding to transceiver node 105-a, then determine that UE 115-a selects to decode control signals received over control resource 205 (ID 1) corresponding to transceiver node 105-b, then determine that UE 115-a selects to decode control signals received over control resource 205 (ID 2) corresponding to transceiver node 105-a, and so on. UE 115-a may continue this control resource 205 selection in successive order for control resources 205, e.g., decode control signals received over control resources 205 having an ID 0 first, then ID 1, then ID 2, then ID 3, and so forth. Accordingly, the decoding configuration ensures that UE 115-a is able to decode, within its decoding limit, control signals received over control resources 205 for each associated transceiver node 105.

Other aspects of this example may include other numbering configurations for the control resources 205, e.g., the numbering may include control resources 205-a corresponding to transceiver node 105-a having IDs of 0, 3, 8, 11, etc., and control resources 205-b corresponding to transceiver node 105-b having IDs of 1, 5, 9, 13, etc. In this example, the network may configure control resources 205 with IDs 0, 1, 3, 5, 8, 9, 11, 13 for the transceiver nodes 105 that UE 115-a communicates with. When UE 115-a uses conventional techniques (e.g., selecting consecutive IDs based on the lowest ID from all control resources 205 configured for UE 115-a) to select control signals received over control resources 205 to decode, it guarantees that control resources 205 are alternately selected for each associated transceiver node 105.

Additionally or alternatively, the decoding configuration may be based on the control resource 205 IDs as well as the IDs associated with each respective transceiver node 105. The network may use any IDs for the control resources 205 corresponding to each respective transceiver node 105. For example, the numbering may include control resources 205-a corresponding to transceiver node 105-a having IDs of 0, 1, 2, 3, etc., and control resources 205-b corresponding to transceiver node 105-b having IDs of 4, 5, 6, 7, etc. The decoding configuration selected by UE 115-a may include (e.g., starting with the lowest ID and for the first transceiver node) UE 115-a selecting to decode control signals received over the lowest ID control resource 205 (ID 0) corresponding to transceiver node 105-a, then the UE 115-a selecting to decode control signals received over the lowest ID control resource 205 (ID 4) corresponding to transceiver node 105-b, then the UE 115-a selecting to decode control signals received over the next lowest ID control resource 205 (ID 1) corresponding to transceiver node 105-a. UE 115-a may continue this selecting to decode control signals received over control resources 205 in ascending order for control resources 205 corresponding to each transceiver node 105. Accordingly, the decoding configuration ensures that UE 115-*a* is able to decode, within its decoding limit, control signals received over control resources 205 for each associated transceiver node 105. Other aspects of this example may include other numbering configurations for the control resources 205, e.g., the numbering may include control resources 205-*a* corresponding to transceiver node 105-*a* having IDs of 0, 1, 4, 7, etc., and control resources 205-*b* corresponding to transceiver node 105-*b* having IDs of 2, 3, 5, 6, etc.

Additionally or alternatively, the decoding configuration may be based on the decoding limit and the number of transceiver nodes 105 associated with UE 115-*a*. For example, the UE 115-*a* may allocate its decoding limit among the associated transceiver nodes 105, regardless of the IDs used for the control resources 205. The network may use any IDs for the control resources 205 corresponding to each respective transceiver node 105. As one example, the numbering may include control resources 205-*a* corresponding to transceiver node 105-*a* having IDs of 0, 3, 5, 6, etc., and control resources 205-*b* corresponding to transceiver node 105-*b* having IDs of 1, 2, 4, 7, etc. The decoding configuration selected by UE 115-*a* may include UE 115-*a* selecting to decode control signals received over the lowest control resource 205 ID (e.g., ID 0) for transceiver node 105-*a*, selecting to decode control signals received over the lowest control resource 205 ID (e.g., ID 1) for transceiver node 105-*b*, selecting to decode control signals received over the next lowest control resource 205 ID (e.g., ID 3) for transceiver node 105-*a*, and so forth. In other examples, the UE 115-*a* may select to decode control signals received over control resources 205 corresponding to the first transceiver node 105-*a* up to the portion of the decoding limit allocated to the first transceiver node 105-*a*, and then move on to other transceiver nodes selecting to decode control signals received over control resources 205 corresponding to each transceiver node 105 up to that transceiver node's 105 respective allocation of the decoding limit. Accordingly, the decoding configuration ensures that UE 115-*a* is able to decode, within its decoding limit, control resources 205 corresponding to each associated transceiver node 105.

It is to be understood that the control resource 205 IDs configured by the network for each associated transceiver node 105 may use any numbering scheme. For example, the network may number search space sets (e.g., control resources 205) configured for UE 115-*a* with IDs that are not consecutive, e.g., may use IDs 0, 2, 5, 7, 9, 12, 13, 15 for eight control resource sets. Any other numbering scheme for the control resource 205 IDs may be used by the network without departing from the scope of the present description.

In some aspects, UE 115-*a* may receive a signal identifying the control resource 205 IDs from the respective transceiver node 105, from a single transceiver node 105, and/or from a different entity (e.g., such as the core network and/or from a base station coordinating with transceiver nodes 105). Moreover, UE 115-*a* may receive a signal identifying the transceiver nodes 105 from the respective transceiver node 105, from a single transceiver node 105, and/or from a different entity (e.g., such as the core network and/or from a base station coordinating with transceiver nodes 105).

In some aspects, any of the decoding configurations may include UE 115-*a* decoding an amount of control signals received over control resources 205 up to its decoding limit. In some aspects, any of the decoding configurations may include UE 115-*a* decoding an amount of control signals received over control resources 205 that satisfies a threshold (e.g., until channel estimation is complete, based on a successful number of BD, and the like).

In some aspects, any of the decoding configurations may include UE 115-*a* decoding two (or more) control signals received over control resources 205 corresponding to transceiver node 105-*a*, and then decoding two (or more) control signals received over control resources 205 corresponding to transceiver node 105-*b*, and so on. Accordingly, the describe decoding configurations are not at all limited to UE 115-*a* decoding one control signal received over control resources 205 corresponding to transceiver node 105-*a*, and then one control signal received over control resource 205 corresponding to transceiver node 105-*b*. Generally, the number of control signals received over control resources 205 that UE 115-*a* decodes corresponding to one transceiver node 105 before moving on to decode control signals received over control resources 205 corresponding to the other transceiver node 105 may be based on the decoding limit of UE 115-*a*, the number of control resources 205 included in the plurality of control resources, and the like.

In some aspects, the decoding configuration may include one or more of the transceiver nodes 105 configuring and/or actually transmitting only a portion (or subset) of the configured plurality of control resources 205. For example, based on the decoding limit of the UE 115-*a*, the network (e.g., base stations, core network, TRPs, etc.) may only transmit a first portion or subset (e.g., the control resources 205 having the lowest IDs) of the control signals over control resources 205 configured for UE 115-*a*.

Figure 3:
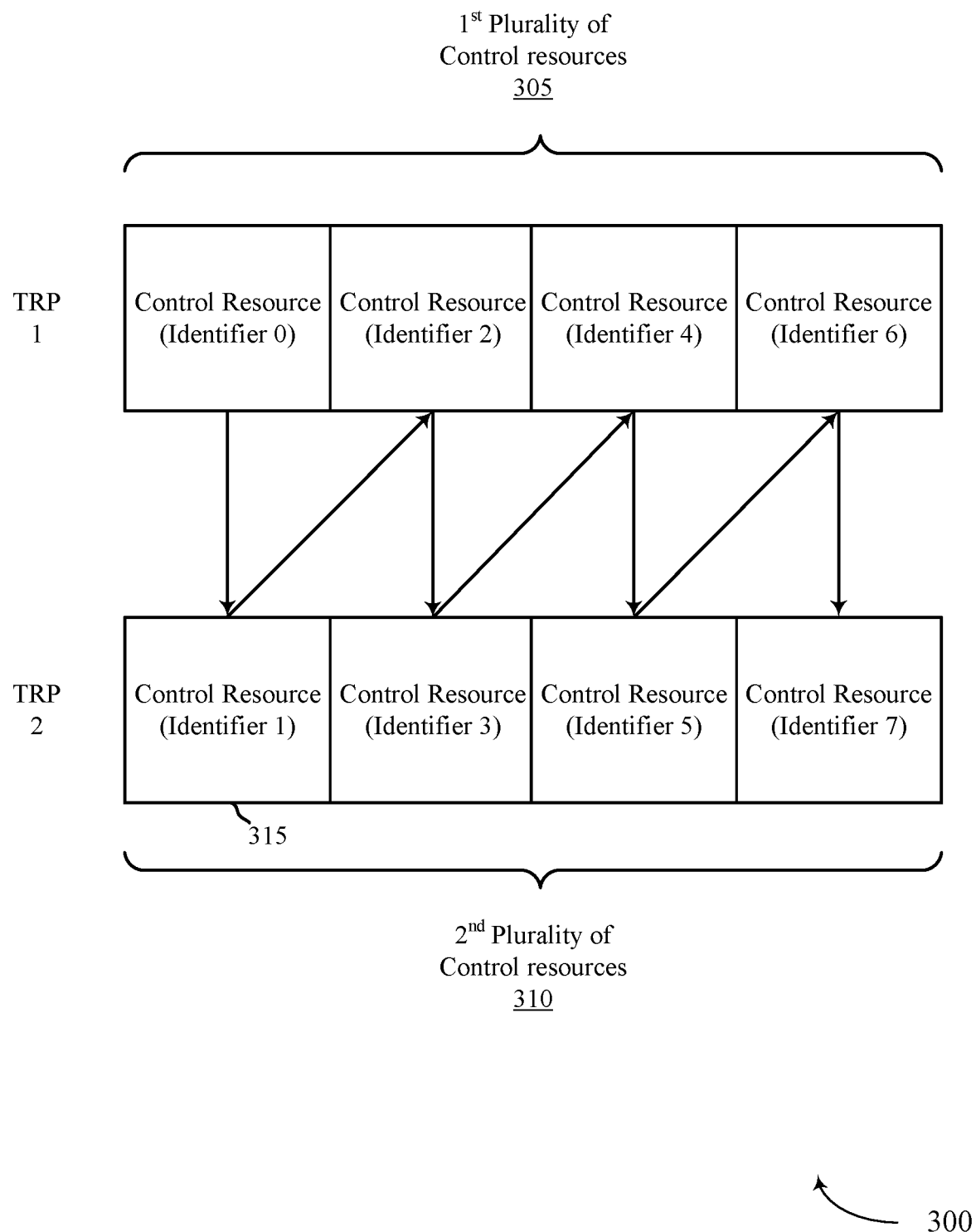
FIG. 3 illustrates an example of a decoding configuration that supports overbooking handling for multiple transceiver nodes in accordance with aspects of the present disclosure.

FIG. 3 illustrates an example of a decoding configuration 300 that supports overbooking handling for multiple transceiver nodes in accordance with aspects of the present disclosure. In some examples, decoding configuration 300 may implement aspects of wireless communication systems 100/200. Aspects of decoding configuration 300 may be implemented by transceiver node, a UE, a base station, and/or a network, which may be examples of the corresponding devices described herein.

Generally, decoding configuration 300 illustrates an example of one decoding configuration that is followed by a UE for performing decoding operations of control information received over various control resources. For example, the UE may be configured or otherwise identify a first plurality of control resources 305 that are associated with or otherwise configured by a first transceiver node (TRP 1) and a second plurality of control resources 310 that are associated with or otherwise configured by a second transceiver node (TRP 2). In some aspects, each of the plurality of control resources 305 and 310 may include a plurality of control resources 315 (e.g., search space sets) configured for the respective transceiver node for the UE to use for receiving control information, performing channel estimation, and the like. For ease of reference, only one control resource 315 is labeled in FIG. 3. Moreover, it is to be understood that each plurality of control resources 305 and/or 310 may include more or fewer control resources 315.

In some aspects, decoding configuration 300 may include the UE selecting to decode, in successive order based at least in part on an ID associated with each control resource 315, first control signals received over a first control resource 315 from the first plurality of control resources 305 before selecting to decode second control signals received over a second control resource 315 from the second plurality of control resources 310. For example, the decoding configuration 300 includes using alternating IDs for each control resource 315 corresponding to the different transceiver nodes. For example, the IDs for the control resources 315 corresponding to the first transceiver node may be selected to have alternating IDs with respect to the IDs for the control resources 315 corresponding to the second transceiver node.

In the example FIG. 3, the IDs for the control resources 315 corresponding to the first transceiver node may be configured as 0, 2, 4, and 6, and the IDs for the control resources 315 corresponding to the second transceiver node may be configured as 1, 3, 5, and 7. Accordingly, the decoding configuration 300 illustrates an example decoding configuration where the UE may begin by selecting to decode control signals received over control resource 315 (ID 0) corresponding to the first transceiver node, followed by the UE selecting to decode control signals received over control resource 315 (ID 1) corresponding to the second transceiver node, next by the UE selecting to decode control signals received over control resource 315 (ID 2) corresponding to the first transceiver node, and continuing by the UE selecting to decode control signals received over control resource 315 (ID 3) corresponding to the second transceiver node, and so forth. Thus, from the UE perspective, the UE successively selects to decode consecutive control resources 315 (e.g., from an ID perspective, 0, 1, 2, 3, and so forth), where the actual control resources 315 corresponding to an individual transceiver node perspective use alternating IDs. In this manner, the network working with the respective transceiver nodes configures the IDs for the control resources 315 such that the UE can follow conventional techniques, while ensuring that the UE implements an efficient and effective decoding configuration, e.g., ensures that the UE decodes control resources 315 corresponding to each associated transceiver node. It is to be understood that other numbering techniques may be sued for the control resources 315 corresponding to each transceiver node, e.g., TRP 1 may be configured with control resource IDs 0, 3, 8, 11, and TRP 2 may be configured with control resource IDs 1, 5, 9, 13.

The example decoding configuration 300 illustrates the UE alternating between selecting to decode control signals received over control resource 315 corresponding to the first transceiver node, then selecting to decode control signals received over control resource 315 corresponding to the second transceiver node, and then moving back to the first transceiver node to select to decode control signals received over control resource 315. However, it is to be understood that other iterations may also be supported in accordance with aspects of the described techniques. For example, the UE could select to decode two or all control signals received over control resources 315 corresponding to the first transceiver node, select to decode two or all control signals received over control resources 315 corresponding to the second transceiver node, and then move back to the first transceiver node to select to decode additional control signals received over control resources 315. Other configurations may also be considered.

In some aspects, the UE may implement decoding configuration 300 to decode as many control signals received over control resources 315 as is permitted according to its decoding limit. In other aspects, the UE may implement decoding configuration 300 to decode only an amount of control signals received over control resources 315 that are needed until a condition or threshold is satisfied. An example condition or threshold may include the UE decoding enough control signals received over control resources 315 corresponding to each transceiver node in order to complete channel estimation, based on a successful BD attempt, and the like.

In some aspects, decoding configuration 300 follows some aspects of current SS set index (or ID) based overbooking handling. In some aspects, this may include the network alternately assigning IDs to SS sets associated with different TRPs instead of assigning a subset of consecutive IDs from all IDs to SS sets for a TRP. Thus, in the example decoding configuration 300 eight USS sets with IDs 0-7 are configured in a slot with IDs from lowest to highest assigned to USS. For example, the network configures USS sets corresponding to TRP 1 and TRP 2 with alternating IDs. Each USS set may need five BDs and the remaining budget of BDs after CSS sets are processed may be 20. According to overbooking handling based on BD limit, the UE may process USS sets 0 and 2 for TRP 1, and USS sets 1 and 3 for TRP 2.

Figure 4:
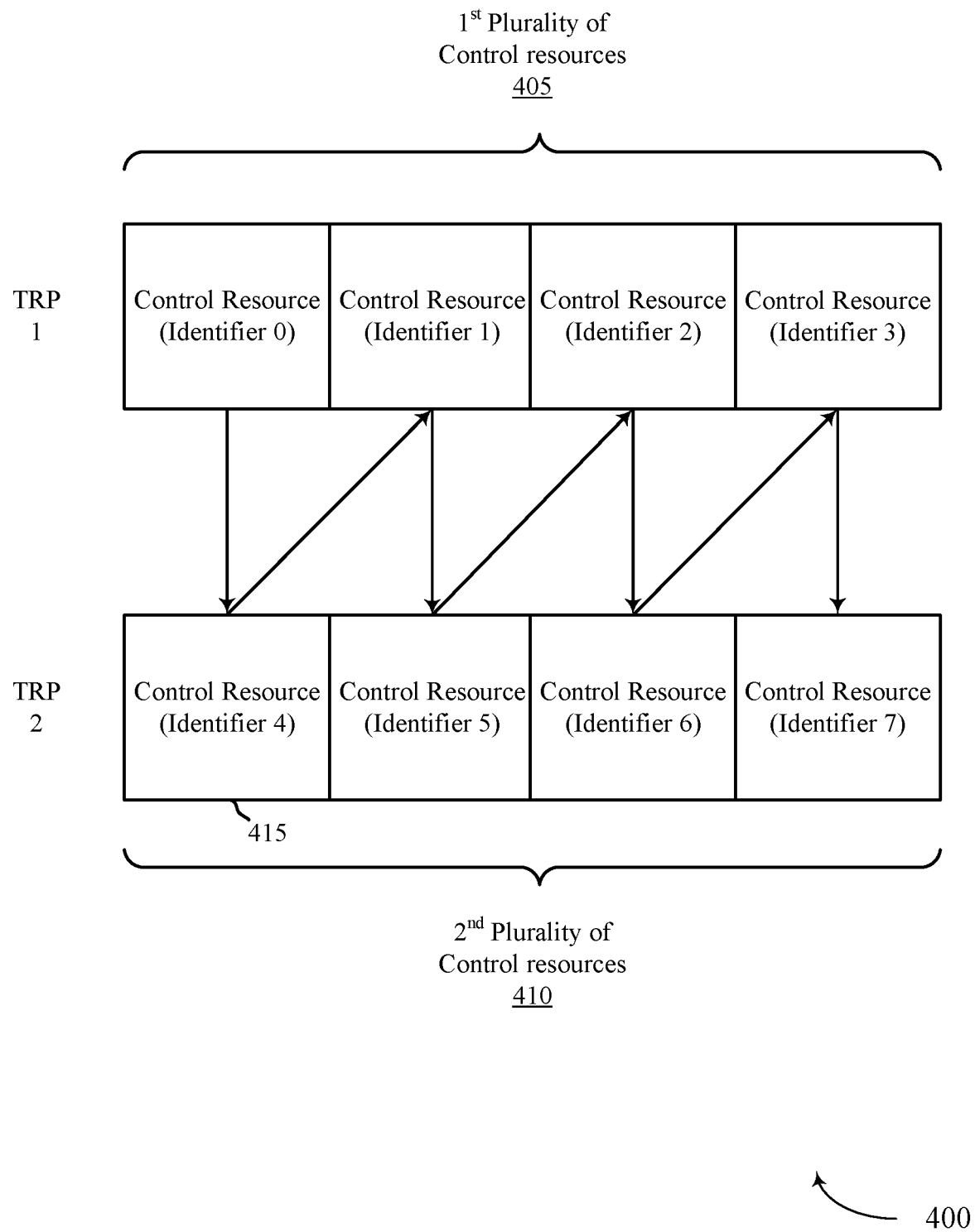
FIG. 4 illustrates an example of a decoding configuration that supports overbooking handling for multiple transceiver nodes in accordance with aspects of the present disclosure.

FIG. 4 illustrates an example of a decoding configuration 400 that supports overbooking handling for multiple transceiver nodes in accordance with aspects of the present disclosure. In some examples, decoding configuration 400 may implement aspects of wireless communication systems 100/200 and/or decoding configuration 300. Aspects of decoding configuration 400 may be implemented by transceiver node, a UE, a base station, and/or a network, which may be examples of the corresponding devices described herein.

Generally, decoding configuration 400 illustrates an example of one decoding configuration for UE to perform decoding operations of control information received over various control resources. For example, the UE may be configured or otherwise identify a first plurality of control resources 405 that are associated with or otherwise configured by a first transceiver node (TRP 1) and a second plurality of control resources 410 that are associated with or otherwise configured by a second transceiver node (TRP 2). In some aspects, each of the plurality of control resources 405 and 410 may include a plurality of control resources 415 (e.g., search space sets) corresponding to the respective transceiver node for the UE to use for receiving control information, performing channel estimation, and the like. For ease of reference, only one control resource 415 is labeled in FIG. 4. Moreover, it is to be understood that each plurality of control resources 405 and/or 410 may include more or fewer control resources 415.

In some aspects, decoding configuration 400 may include the UE selecting to decode control signals received over control resources 415 based at least in part on both the control resource 415 IDs and an ID for each associated transceiver node. That is, the UE may select a decoding configuration that considers both the control resource 415 IDs as well as the transceiver node IDs to ensure that control signals received over control resources 415 corresponding to each transceiver node are decoded. This may include the UE selecting to decode first control signals received over a first control resource 415 from the first plurality of control resources 405, selecting to decode second control signals received over a second control resource 415 from the second plurality of control resources 410, selecting to decode third control signals received over a third control resource 415 from the first plurality of control resources 405, and so forth. The UE may repeat this in an iterative fashion according to the decoding configuration 400 in order to ensure that control signals received over control resources 415 corresponding to each associated transceiver node are selected for decoding.

With respect to the control resource 415 IDs, the UE may select to decode control signals received over control resource 415 having the lowest ID (e.g., ID 0) corresponding to the first transceiver node in the first iteration, and select control signals received over control resource 415 having a lowest ID (e.g., ID 4) corresponding to the second transceiver node in the second iteration, and so forth. Accordingly, and as is illustrated in decoding configuration 400, the UE may select to decode control signals received over control resource 415 (ID 0) corresponding to the first transceiver node, then select to decode control signals received over control resource 415 (ID 4) corresponding to the second transceiver node, then select to decode control signals received over control resource 415 (ID 1) corresponding to the first transceiver node, and so forth. In this manner, the network working with the respective transceiver nodes configures the IDs for the control resources 415 such that the UE can follow aspects of the conventional techniques, while ensuring that the UE implements an efficient and effective decoding configuration, e.g., ensures that the UE decodes control resources 415 corresponding to each associated transceiver node. It is to be understood that other numbering techniques may be used for the control resources 415 corresponding to each transceiver node, e.g., TRP 1 may be configured with control resource IDs 0, 1, 4, 7, and TRP 2 may be configured with control resources IDs 2, 3, 5, 6.

Aspects of decoding configuration 400 may include the UE determining or otherwise identifying the IDs associated with the first transceiver node and the second transceiver node. In some examples, the UE may determine the transceiver node's IDs based on explicit signaling (e.g., from the respective transceiver node, from a single transceiver node, from a base station, etc.). In some examples, the UE may determine the transceiver node's IDs based on a one-to-one mapping between the transceiver node and another entity, such as a control resource set (coreset), cell ID, etc. For example, a particular coreset/cell ID, or group of coresets/cell IDs may be associated with a single transceiver node.

The example decoding configuration 400 illustrates the UE alternating between decoding control signals received over control resource 415 corresponding to the first transceiver node, then decoding control signals received over control resource 415 corresponding to the second transceiver node, and then moving back to the first transceiver node to decode control signals received over control resource 415. However, it is to be understood that other iterations may also be supported in accordance with aspects of the described techniques. For example, the UE could select to decode two control signals received over control resources 415 (IDs 0 and 1) corresponding to the first transceiver node, decode two more control signals received over control resources 415 (IDs 4 and 5) corresponding to the second transceiver node, and then move back to the first transceiver node to decode additional control signals received over control resources 415. Other configurations may also be considered.

In some aspects, the UE may implement decoding configuration 400 to decode as many control signals received over control resources 415 as is permitted according to its decoding limit. In other aspects, the UE may implement decoding configuration 400 to decode only an amount of control signals received over control resources 415 that are needed until a condition or threshold is satisfied. An example condition or threshold may include the UE decoding enough control signal received over control resources 415 corresponding to each transceiver node in order to complete channel estimation, based on a successful BD attempt, and the like.

In some aspects, decoding configuration 400 illustrates an example where overbooking handling is based on both the TRP ID (e.g., transceiver node ID) and SS set ID (e.g., control resource 415 ID). For example, when the UE counts BD or CCE number for USS sets, starting from the TRP with lowest TRP ID, the UE counts the lowest ID USS set associated with the TRP that is not counted yet. Then the UE switches to the next higher ID TRP to check a USS set. As one non-limiting example, eight USS sets are configured with the four lowest USS set IDs to TRP 1 and the other four to TRP 2. Each USS set may use five BDs and the remaining budget of BDs after CSS sets are processed is 20. According to overbooking handling based on BD limit, USS set 0 and 1 are processed for TRP 1, and USS set 4 and 5 are processed for TRP 2.

Figure 5:
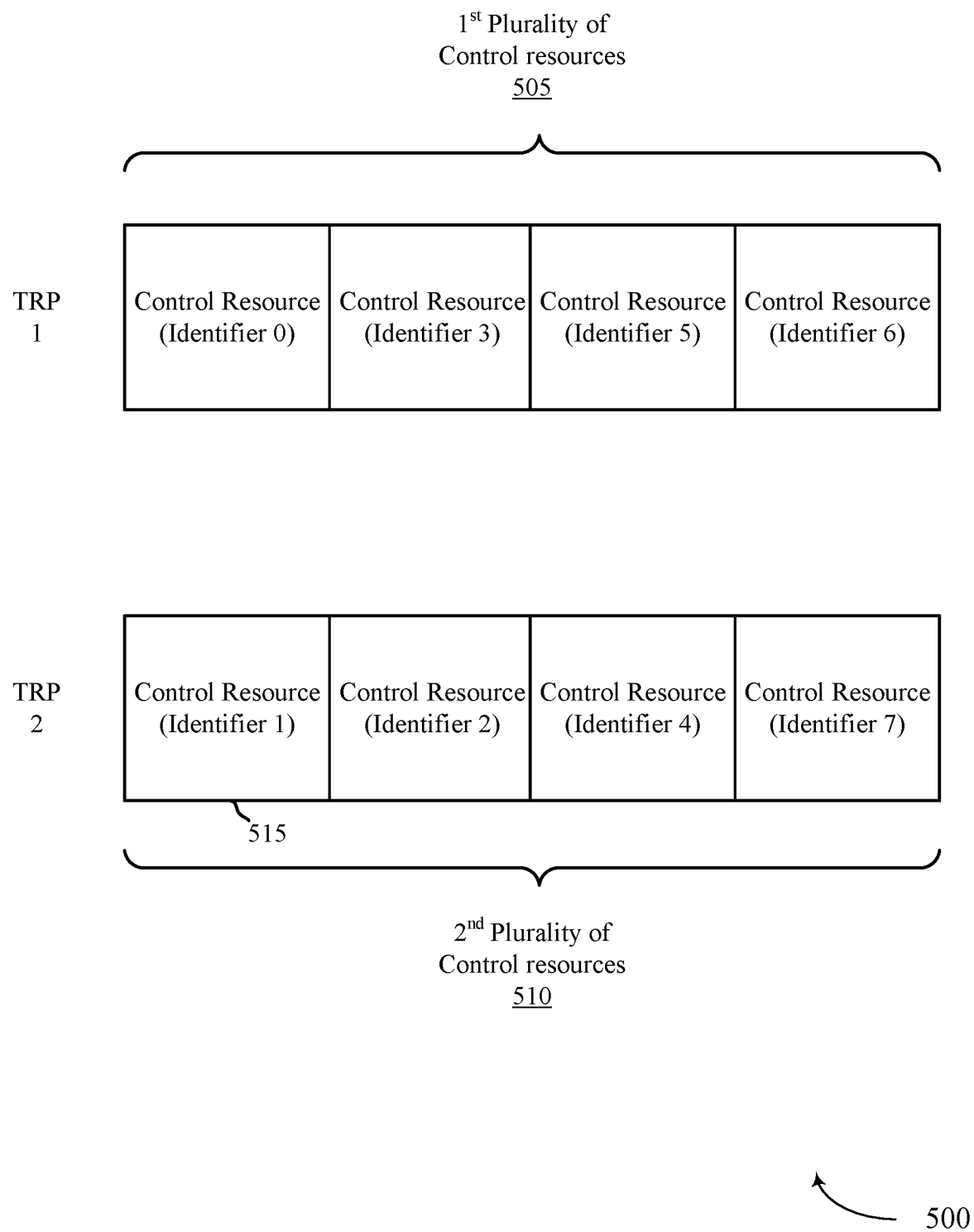
FIG. 5 illustrates an example of a decoding configuration that supports overbooking handling for multiple transceiver nodes in accordance with aspects of the present disclosure.

FIG. 5 illustrates an example of a decoding configuration 500 that supports overbooking handling for multiple transceiver nodes in accordance with aspects of the present disclosure. In some examples, decoding configuration 500 may implement aspects of wireless communication systems 100/200 and/or decoding configurations 300/400. Aspects of decoding configuration 500 may be implemented by transceiver node, a UE, a base station, and/or a network, which may be examples of the corresponding devices described herein.

Generally, decoding configuration 500 illustrates an example of one decoding configuration that can be selected by a UE for performing decoding operations of control information received over various control resources. For example, the UE may be configured or otherwise identify a first plurality of control resources 505 that are associated with or otherwise configured by a first transceiver node (TRP 1) and a second plurality of control resources 510 that are associated with or otherwise configured by a second transceiver node (TRP 2). In some aspects, each of the plurality of control resources 505 and 510 may include a plurality of control resources 515 (e.g., search space sets) corresponding to the respective transceiver node for the UE to use for receiving control information, performing channel estimation, and the like. For ease of reference, only one control resource 515 is labeled in FIG. 5. Moreover, it is to be understood that each plurality of control resources 505 and/or 510 may include more or fewer control resources 515.

In some aspects, decoding configuration 500 may include the UE selecting to decode control signals received over control resources 515 based at least in part on an ID for each associated transceiver node and the decoding limit of the UE. That is, the UE may select a decoding configuration that considers the transceiver node IDs to ensure that control signals received over control resources 515 corresponding to each transceiver node are decoded up to the decoding limit of the UE. The UE may divide its decoding limit amongst associated transceiver nodes (e.g., allocate a portion of the decoding limit to a first transceiver node and allocate another portion of the decoding limit to a second transceiver node). The UE may then select to decode control signals received over control resources 505 corresponding to the first transceiver node up to its (the first transceiver node's) allocated decoding limit and then select to decode control signals received over control resources 515 corresponding to a second transceiver node up to its (the second transceiver node's) allocated decoding limit. That is, the UE may select to decode control signals received over control resources 515 corresponding to each transceiver node, in any order, up to the allocated portion of the decoding limit for each transceiver node.

With respect to the control resource 515 IDs, the UE may optionally select to decode control signals received over a control resource 515 having the lowest ID (e.g., ID 0) corresponding to the first transceiver node, select to decode control signals received over a control resource 515 having a lowest ID (e.g., ID 1) corresponding to the second transceiver node, and so forth. In another example, the UE may select to decode control signals received over control resources 515 (ID 0 and ID 3) corresponding to the first transceiver node (e.g., up to the portion of the decoding limit allocated to the first transceiver node), and then select to decode control signals received over control resource 515 (ID 1 and ID 2) corresponding to the second transceiver node (e.g., up to the portion of the decoding limit allocated to the second transceiver node). In this manner, the network working with the respective transceiver nodes configures the IDs for the control resources 515 such that the UE can follow aspects of the conventional techniques, while ensuring that the UE implements an efficient and effective decoding configuration, e.g., ensures that the UE selects to decode control signals received over control resources 515 corresponding to each associated transceiver node.

Aspects of decoding configuration 500 may include the UE determining or otherwise identifying the IDs associated with the first transceiver node and the second transceiver node. In some examples, the UE may determine the transceiver node's IDs based on explicit signaling (e.g., from the respective transceiver node, from a single transceiver node, from a base station, etc.). In some examples, the UE may determine the transceiver node's IDs based on a one-to-one mapping between the transceiver node and another entity, such as a coreset, cell ID, etc. For example, a particular coreset/cell ID, or group of coresets/cell IDs may be associated with a single transceiver node.

The example decoding configuration 500 may include the UE selecting to decode control signals received over control resource 515 corresponding to the first transceiver node up to its allocated decoding limit, then selecting to decode control signals received over control resource 515 corresponding to the second transceiver node up to its allocated decoding limit. However, it is to be understood that other iterations may also be supported in accordance with aspects of the described techniques.

In some aspects, the UE may implement decoding configuration 500 to decode as many control signals received over control resources 515 as is permitted according to its decoding limit. In other aspects, the UE may implement decoding configuration 500 to decode only an amount of control signals received over control resources 515 that are needed until a condition or threshold is satisfied. An example condition or threshold may include the UE decoding enough control signals received over control resources 515 corresponding to each transceiver node in order to complete channel estimation, based on a successful BD attempt, and the like.

In some aspects, decoding configuration 500 illustrates an example where the UE splits the CCE/BD limits (e.g., the decoding limit) among TRPs and counts BD and CCE numbers for USS sets (e.g., control resources 515) associated with each TRP based on the USS set ID. The BD and CCE budgets of USS sets associated with the TRP may be consumed until the limit for each TRP is reached. For each TRP, SS sets with lower IDs may optionally be counted before SS sets with higher IDs. As one non-limiting example, eight USS sets may be configured for the UE with four USS sets for each TRP. Each USS set may need five BDs and the remaining budget of BDs after CSS sets are counted is 20. According to overbooking handling based on BD limit split amongst the TRPs, the UE may process USS sets 0 and 3 for TRP 1 and USS sets 1 and 2 for TRP 2.

Figure 6:
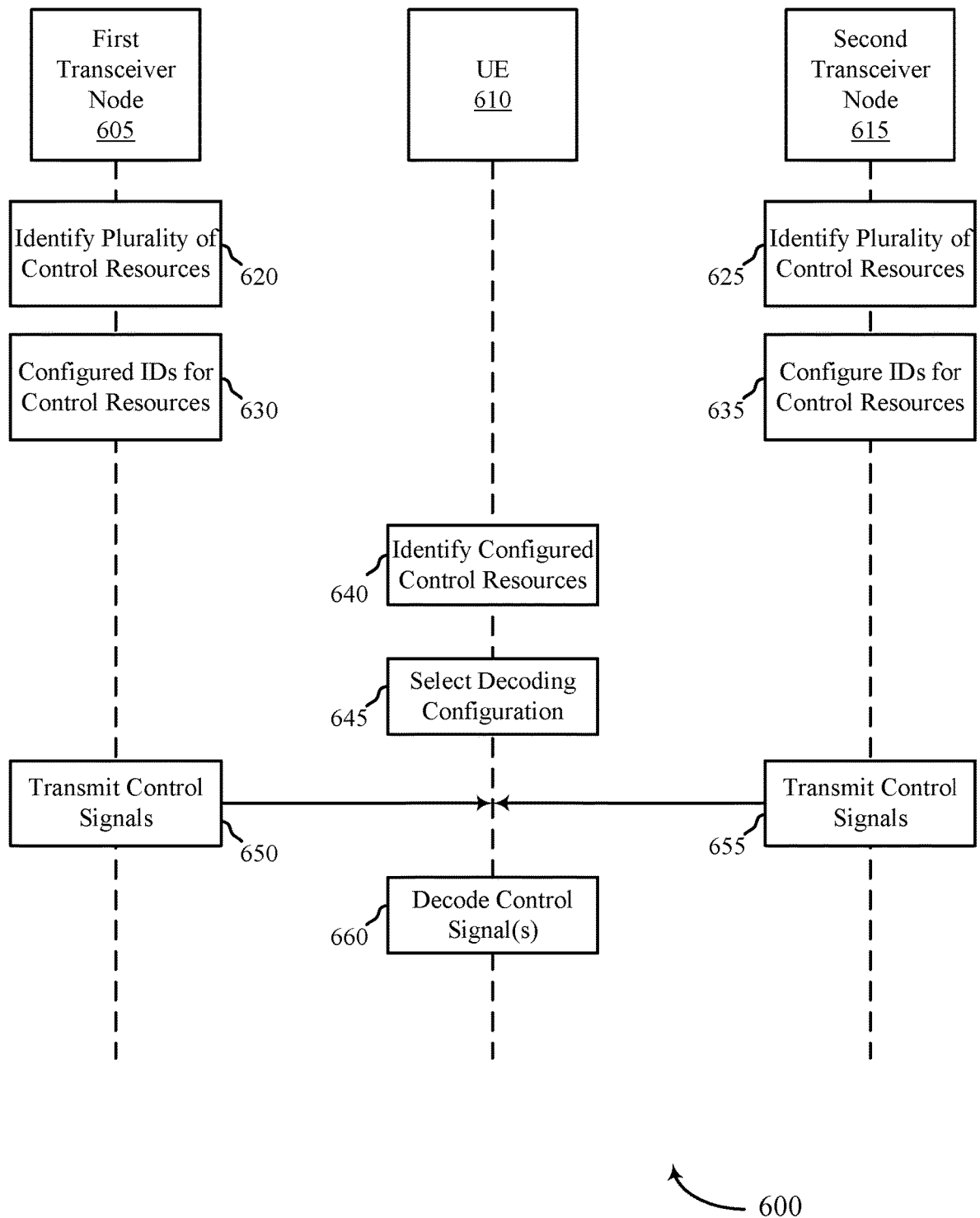
FIG. 6 illustrates an example of a process that supports overbooking handling for multiple transceiver nodes in accordance with aspects of the present disclosure.

FIG. 6 illustrates an example of a process 600 that supports overbooking handling for multiple transceiver nodes in accordance with aspects of the present disclosure. In some examples, process 600 may implement aspects of wireless communication systems 100/200 and/or decoding configurations 300/400/500. Aspects of process 600 may be implemented by a first transceiver node 605, a UE 610, and/or a second transceiver node 615, which may be examples of the corresponding devices described herein. In some aspects, the first transceiver node 605 and the second transceiver node 615 may be examples of a TRP.

At 620, the first transceiver node 605 may identify a plurality of control resource for UE 610. For example, the first transceiver node 605 may individually configure the plurality of control resources, may coordinate with the second transceiver node 615 to configure the plurality of control resources, may be configured with the plurality of control resources by a controlling entity (e.g., a base station, core network, etc.).

At 625, the second transceiver node 615 may identify a plurality of control resource for UE 610. For example, the second transceiver node 615 may individually configure the plurality of control resources, may coordinate with the first transceiver node 605 to configure the plurality of control resources, may be configured with the plurality of control resources by a controlling entity (e.g., a base station, core network, etc.).

At 630, the first transceiver node 605 may configure an ID for each control resource in the plurality of control resources. In some aspects, this may include configuring the ID for each control resource using a consecutive number or using a non-consecutive number. In some aspects, this may include configuring the ID for each control resource based on an ID associated with the first transceiver node 605. In some aspect, this may include configuring the ID for each control resource based on the number of transceiver nodes that are associated with UE 610. For example, the first transceiver node 605 may use alternating IDs such that, when combined with control resource IDs from other transceiver nodes, the control resource IDs are consecutive.

At 635, the second transceiver node 615 may configure an ID for each control resource in the plurality of control resources. In some aspects, this may include configuring the ID for each control resource using a consecutive number or using a non-consecutive number. In some aspects, this may include configuring the ID for each control resource based on an ID associated with the second transceiver node 615. In some aspects, this may include configuring the ID for each control resource based on the number of transceiver nodes that are associated with UE 610. For example, the second transceiver node 615 may use alternating IDs such that, when combined with control resource IDs from other transceiver nodes, the control resource IDs are consecutive. In some aspects, the features performed at 620/625 and/or 630/635 may be performed at the same time or at different times by the respective transceiver nodes.

At 640, UE 610 may identify the plurality of control resources associated with the first transceiver node 605 (e.g., the first plurality of control resources) and the plurality of control resources associated with the second transceiver node 615 (e.g., the second plurality of control resources). This may include UE 610 receiving a signal from each respective transceiver node or from a single transceiver node (e.g., either of the transceiver nodes 605 or 615, or from a different transceiver node) that indicates the IDs for the control resources.

In some aspects, this may include UE 610 receiving a signal from each respective transceiver node or from a single transceiver node (e.g., either of transceiver nodes 605 or 615 or from a different transceiver node) that indicates the IDs for the transceiver nodes 605 and/or 615.

At 645, UE 610 may select a decoding configuration to use for decoding control signals received over control resource(s) from the plurality of control resources associated with transceiver node 605 and for decoding control signals received over control resource(s) from the plurality of control resources associated with transceiver node 615. In some aspects, UE 610 may select the decoding configuration based on a decoding limit (e.g., a BD limit and/or CCE estimation limit) associated with UE 610.

In some aspects, this may include UE 610 selecting to decode, in successive order based at least in part on an ID associated with each control resource, a first control signal received over control resource from the first plurality of control resources before a second control signal received over control resources from the second plurality of control resources. For example, the control resources in the first plurality of control resources and the control resources in the second plurality of control resources may use alternating IDs for each control resource. As another example, the control resources in the first plurality of control resources may use consecutive IDs for each control resource and the control resources in the second plurality of control resources may use consecutive IDs for each control resource, and the IDs for the control resources in the first plurality of control resources do not overlap with the IDs for the control resources in the second plurality of control resources.

In some aspects, this may include UE 610 selecting first control signals received over a first control resource of the first plurality of control resource to decode and selecting second control signals received over a second control resource of the second plurality of control resources to decode. The UE 610 may repeat, based at least in part on the decoding limit, the decoding of control signals received over control resources from the first plurality of control resources followed by the decoding of control signals received over control resources from the second plurality of control resources. In some aspects, UE 610 may determine a first ID associated with the first transceiver node 605 and a second ID associated with or the second transceiver node 615, wherein decoding the first control signals received over the first control resource and the second control signals received over the second control resource is based at least in part on the first ID and the second ID.

In some aspects, this may include UE 610 identifying a number of transceiver nodes communicating control signals received over control resources to the UE and selecting, based at least in part on the decoding limit and the number of transceiver nodes, to decode a portion of control signals received over control resources received corresponding to each transceiver node.

At 650, the first transceiver node 605 may transmit (and UE 610 may receive) control signals using the control resources in the plurality of control resources. In some aspects, this may include the first transceiver node 605 transmitting the control signals in an order corresponding to the IDs associated with the respective control resources.

At 655, the second transceiver node 615 may transmit (and UE 610 may receive) control signals received over the control resources from the plurality of control resources associated with the second transceiver node 615. In some aspects, this may include the second transceiver node 615 transmitting the control signals in an order corresponding to the IDs associated with the respective control resources.

At 660, UE 610 may decode the received control signals transmitted over the control resources according to the decoding configuration. In some aspects, this may include UE 610 decoding control signals from the plurality of control resources associated with the first transceiver node 605 and from the plurality of control resources associated with the second transceiver node 615.

Figure 7:
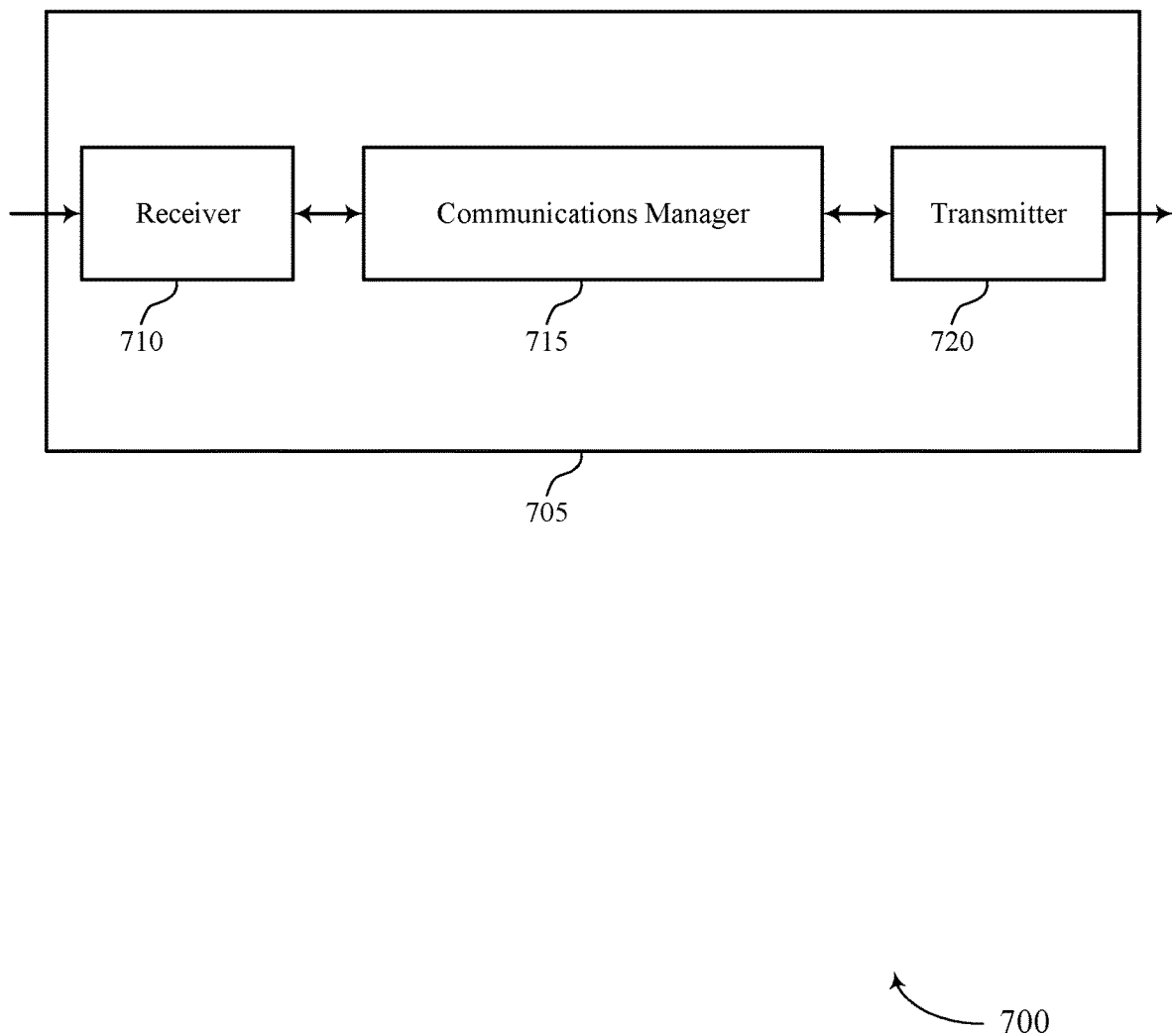
FIGS. 7 and 8 show block diagrams of devices that support overbooking handling for multiple transceiver nodes in accordance with aspects of the present disclosure.

FIG. 7 shows a block diagram 700 of a device 705 that supports overbooking handling for multiple transceiver nodes in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to overbooking handling for multiple transceiver nodes, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may identify a first set of control resources associated with a first transceiver node and a second set of control resources associated with a second transceiver node, select, based on a decoding limit for the UE, a decoding configuration to use for decoding one or more control resources from the first set of control resources and one or more resources from the second set of control resources, and decode received control signals received over control resources from the first set of control resources and the second set of control resources according to the decoding configuration. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
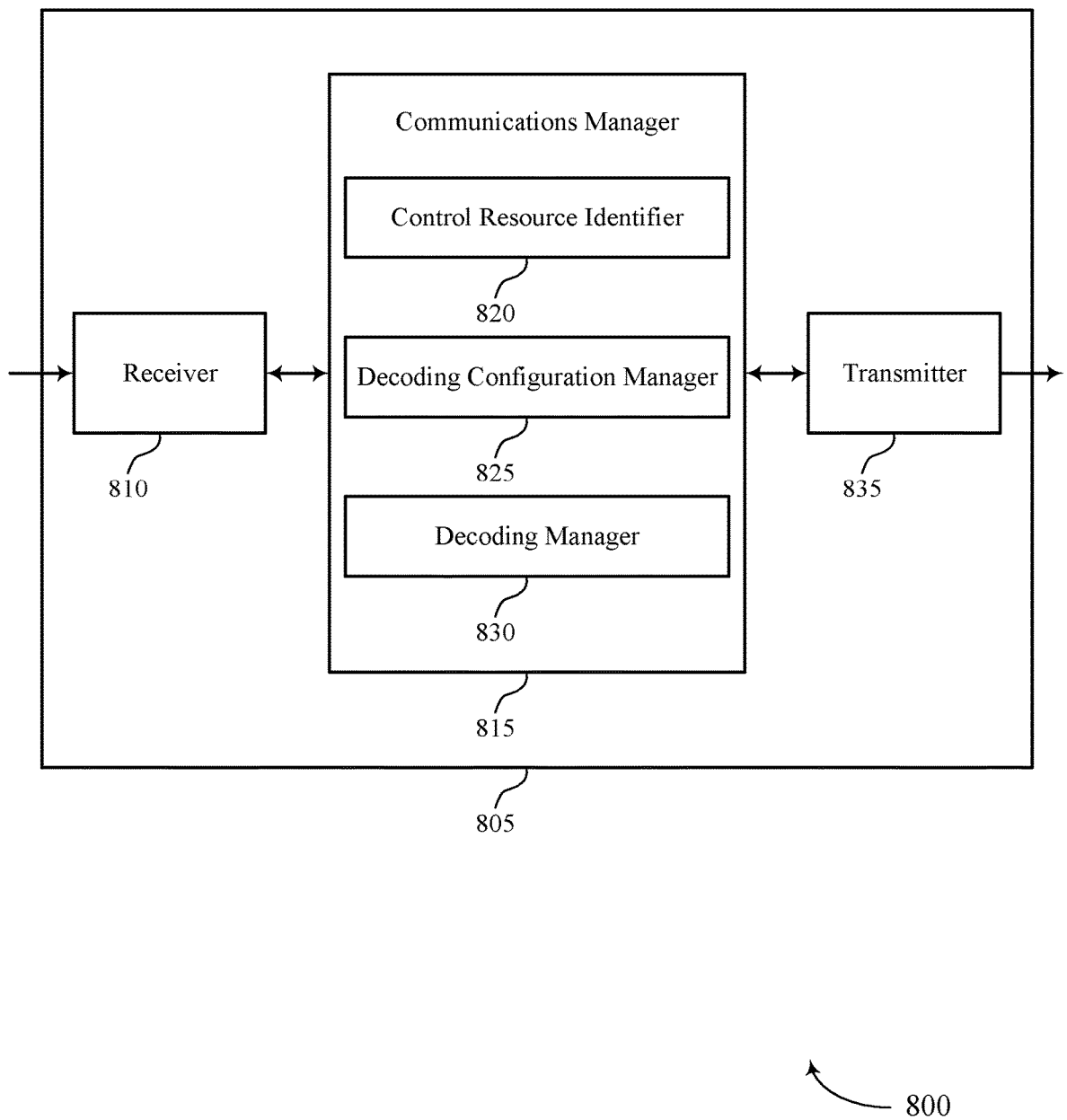

FIG. 8 shows a block diagram 800 of a device 805 that supports overbooking handling for multiple transceiver nodes in accordance with aspects of the present disclosure. The device 805 may be an example of aspects of a device 705 or a UE 115 as described herein. The device 805 may include a receiver 810, a communications manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to overbooking handling for multiple transceiver nodes, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a control resource identifier 820, a decoding configuration manager 825, and a decoding manager 830. The communications manager 815 may be an example of aspects of the communications manager 1010 described herein.

The control resource identifier 820 may identify a first set of control resources associated with a first transceiver node and a second set of control resources associated with a second transceiver node.

The decoding configuration manager 825 may select, based on a decoding limit for the UE, a decoding configuration to use for decoding one or more control resources from the first set of control resources and one or more resources from the second set of control resources.

The decoding manager 830 may decode received control signals received over control resources from the first set of control resources and the second set of control resources according to the decoding configuration.

The transmitter 835 may transmit signals generated by other components of the device 805. In some examples, the transmitter 835 may be collocated with a receiver 810 in a transceiver module. For example, the transmitter 835 may be an example of aspects of the transceiver 1020 described with reference to FIG. 10. The transmitter 835 may utilize a single antenna or a set of antennas.

Figure 9:
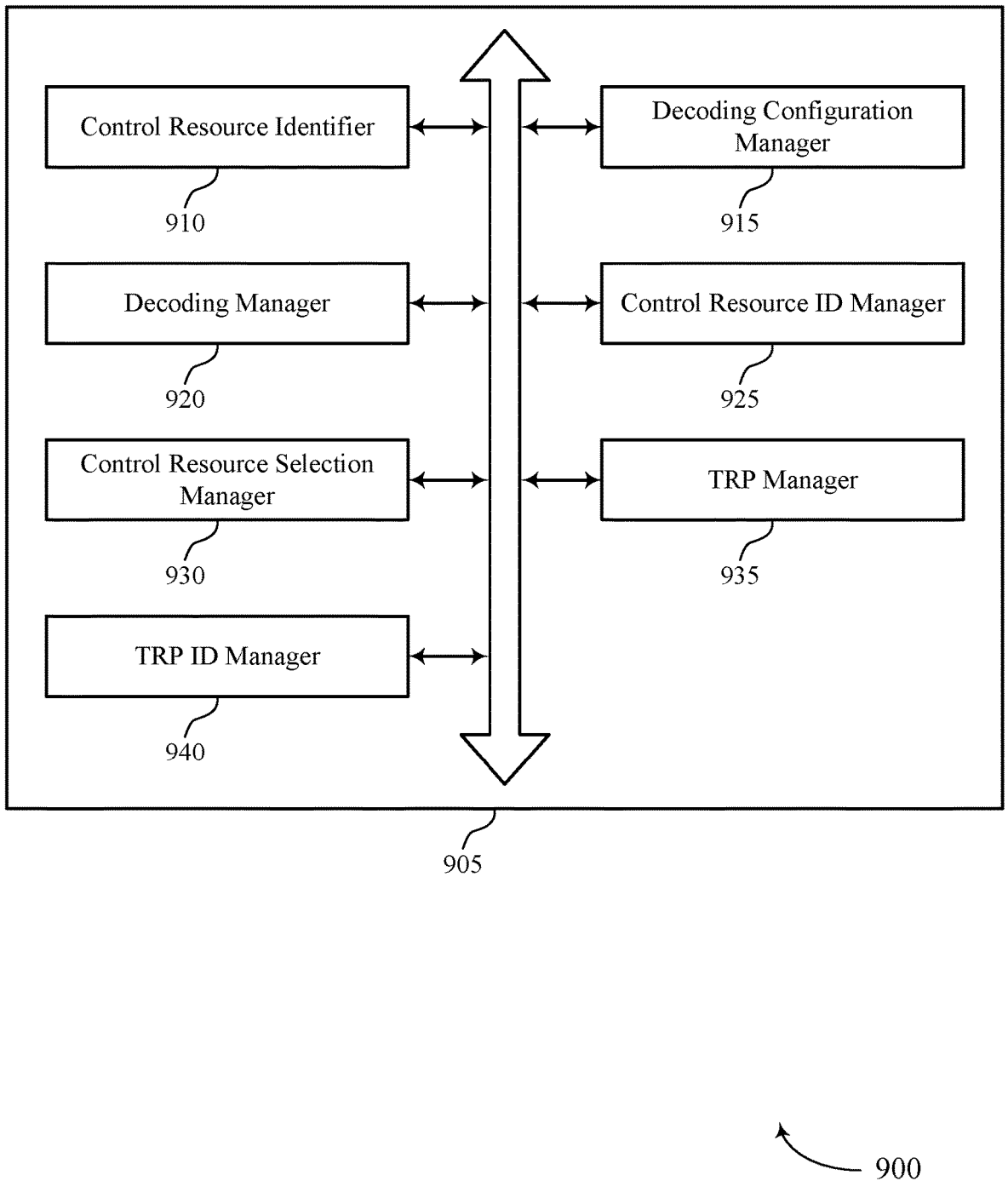
FIG. 9 shows a block diagram of a communications manager that supports overbooking handling for multiple transceiver nodes in accordance with aspects of the present disclosure.

FIG. 9 shows a block diagram 900 of a communications manager 905 that supports overbooking handling for multiple transceiver nodes in accordance with aspects of the present disclosure. The communications manager 905 may be an example of aspects of a communications manager 715, a communications manager 815, or a communications manager 1010 described herein. The communications manager 905 may include a control resource identifier 910, a decoding configuration manager 915, a decoding manager 920, a control resource ID manager 925, a control resource selection manager 930, a TRP manager 935, and a TRP ID manager 940. Each of these modules may communicate, directly or indirectly, with one another (e.g., via one or more buses).

The control resource identifier 910 may identify a first set of control resources associated with a first transceiver node and a second set of control resources associated with a second transceiver node. In some cases, each control resource in the first set of control resources and the second set of control resources includes a search space set.

The decoding configuration manager 915 may select, based on a decoding limit for the UE, a decoding configuration to use for decoding one or more control resources from the first set of control resources and one or more resources from the second set of control resources. In some cases, the decoding limit is based on a number of blind decoding limits per slot or a number of CCEs for channel estimation per scheduling unit. The scheduling unit may be defined as a slot or a span containing up to three consecutive symbols where PDCCH is monitored in at least one of the consecutive symbols.

The decoding manager 920 may decode received control signals received over control resources from the first set of control resources and the second set of control resources according to the decoding configuration.

The control resource ID manager 925 may select to decode, in successive order based on an identifier associated with each control resource, first control signals received over a first control resource from the first set of control resources before second control signals received over a second control resource from the second set of control resources.

In some examples, the control resource ID manager 925 may receive a signal from the first transceiver node indicating identifiers for the control resources in the first set of control resources. In some examples, the control resource ID manager 925 may receive a signal from the second transceiver node indicating identifiers for the control resources in the second set of control resources.

In some examples, the control resource ID manager 925 may receive a signal from a single transceiver node indicating identifiers for the control resources in the first set of control resources and identifiers for the control resources in the second set of control resources. In some cases, the control resources in the first set of control resources and the control resources in the second set of control resources include alternating identifiers for each control resource.

The control resource selection manager 930 may select to decode first control signals received over a first control resource of the first set of control resources. In some examples, the control resource selection manager 930 may select to decode second control signals received over a second control resource of the second set of control resources.

In some examples, the control resource selection manager 930 may repeat, based on the decoding limit, the decoding of control signals received over control resources from the first set of control resources followed by the decoding of control signals received over control resources from the second set of control resources. In some examples, the control resource selection manager 930 may determine a first identifier associated with the first transceiver node and a second identifier associated with the second transceiver node, where decoding the first control signals and the second control signals is based on the first identifier and the second identifier.

The TRP manager 935 may identify a number of transceiver nodes communicating control signals to the UE. In some examples, the TRP manager 935 may divide, based on the decoding limit, the decoding limit between the transceiver nodes. In some examples, the TRP manager 935 may select, based on the dividing, to decode control signals received over control resources corresponding to each transceiver node. In some examples, the decoding limit of the UE may include a first decoding limit associated with a first TRP and a second decoding limit associated with a second TRP. In some examples, summation of the first decoding limit and the second decoding limit may be no larger than the decoding limit for the UE when it communicates with a single TRP.

The TRP ID manager 940 may receive a signal from the first transceiver node indicating a first identifier for the first transceiver node. In some examples, the TRP ID manager 940 may receive a signal from the second transceiver node indicating a second identifier for the second transceiver node. In some examples, the TRP ID manager 940 may receive a signal from a single transceiver node indicating a first identifier for the first transceiver node and a second identifier for the second transceiver node. In some cases, the first transceiver node includes a first TRP and the second transceiver node includes a second TRP.

Figure 10:
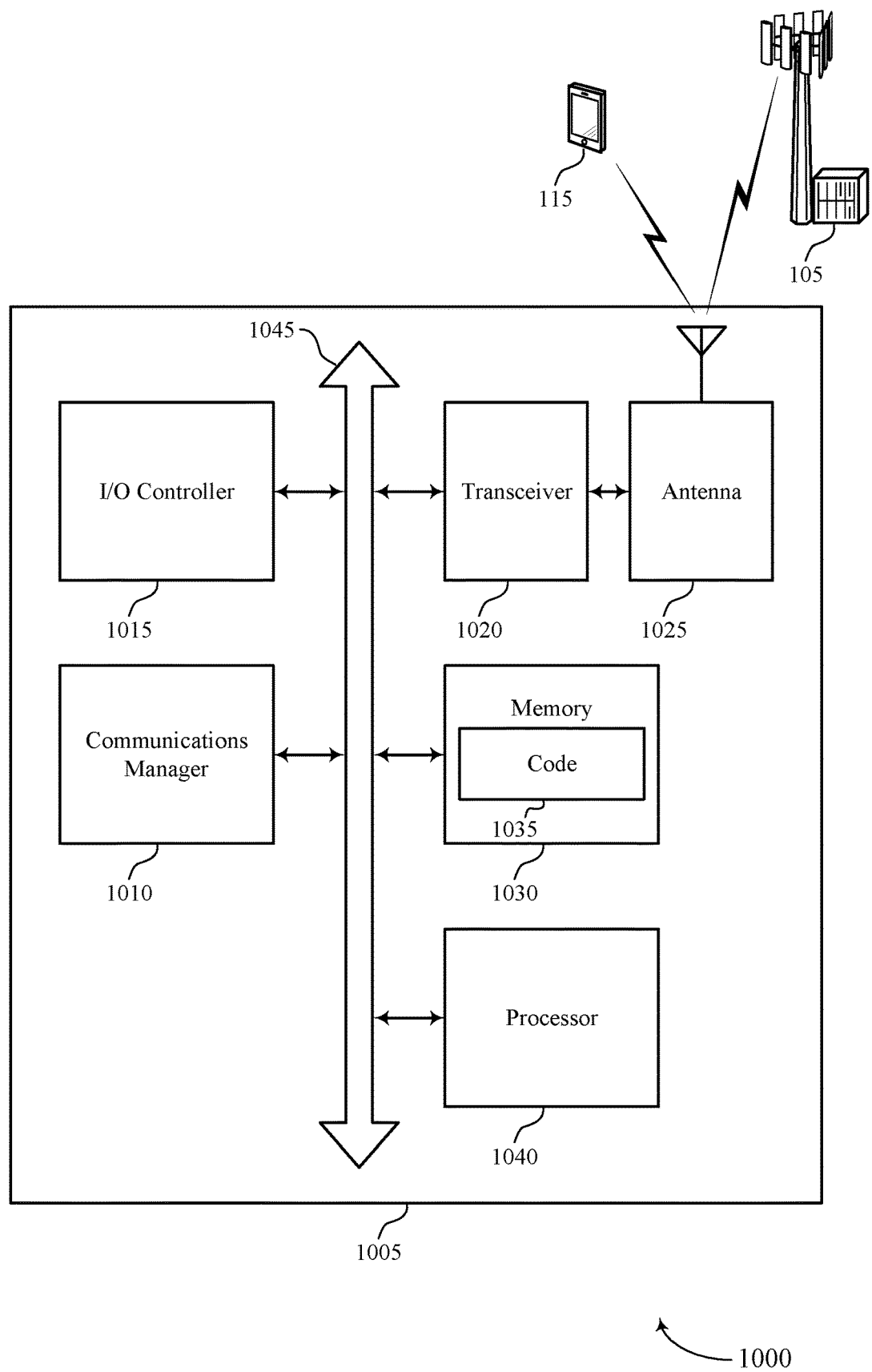
FIG. 10 shows a diagram of a system including a device that supports overbooking handling for multiple transceiver nodes in accordance with aspects of the present disclosure.

FIG. 10 shows a diagram of a system 1000 including a device 1005 that supports overbooking handling for multiple transceiver nodes in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may identify a first set of control resources associated with a first transceiver node and a second set of control resources associated with a second transceiver node, select, based on a decoding limit for the UE, a decoding configuration to use for decoding one or more control resources from the first set of control resources and one or more resources from the second set of control resources, and decode received control signals received over control resources from the first set of control resources and the second set of control resources according to the decoding configuration.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting overbooking handling for multiple transceiver nodes).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
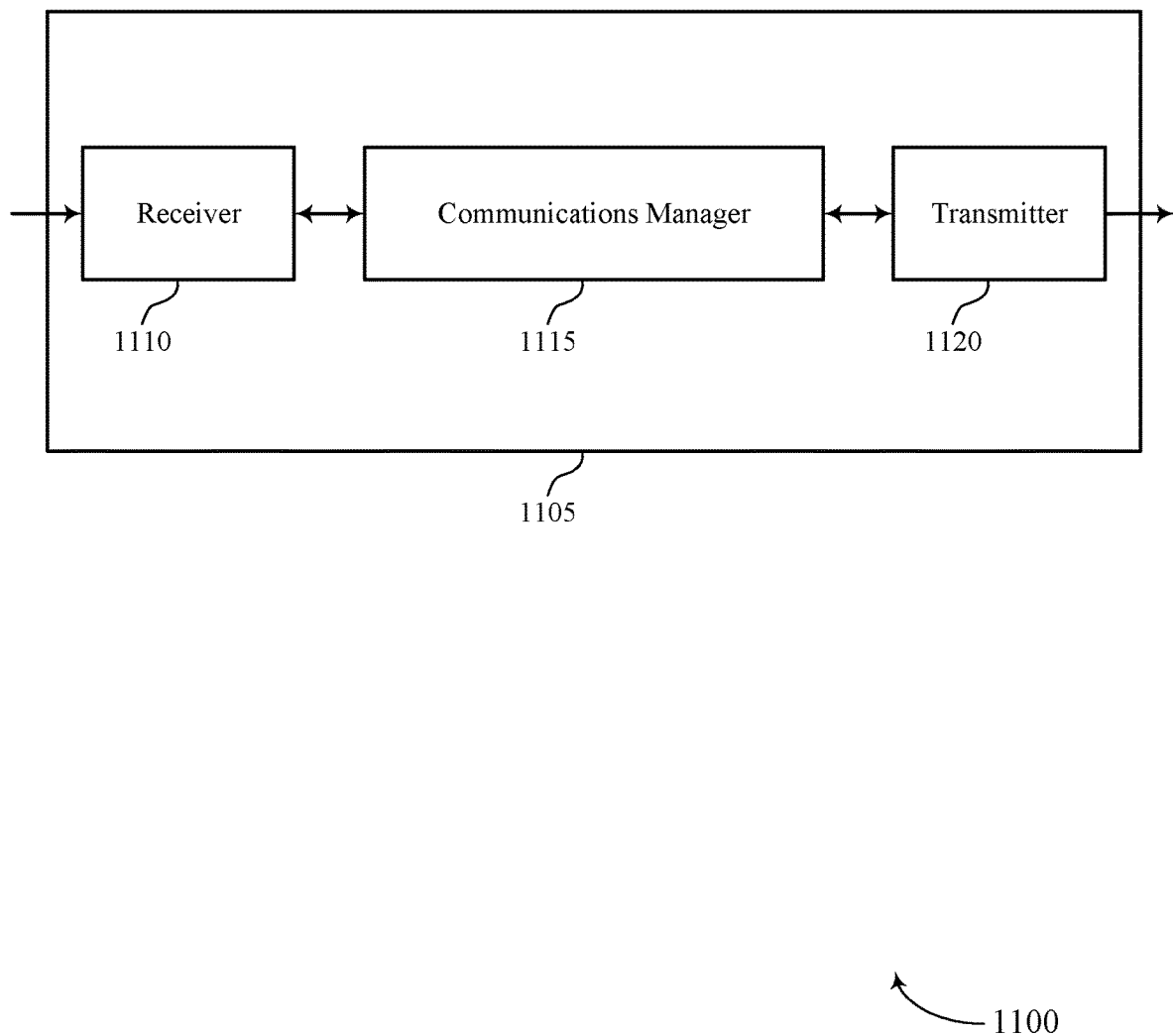
FIGS. 11 and 12 show block diagrams of devices that support overbooking handling for multiple transceiver nodes in accordance with aspects of the present disclosure.

FIG. 11 shows a block diagram 1100 of a device 1105 that supports overbooking handling for multiple transceiver nodes in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to overbooking handling for multiple transceiver nodes, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may identify a set of control resources configured for a UE, configure an identifier for each control resource in the set of resources based on a number of transceiver nodes transmitting control resources to the UE, and transmit a set of control signals to the UE using the control resources in the set of control resources, each control resource transmitted in an order corresponding to the identifier. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
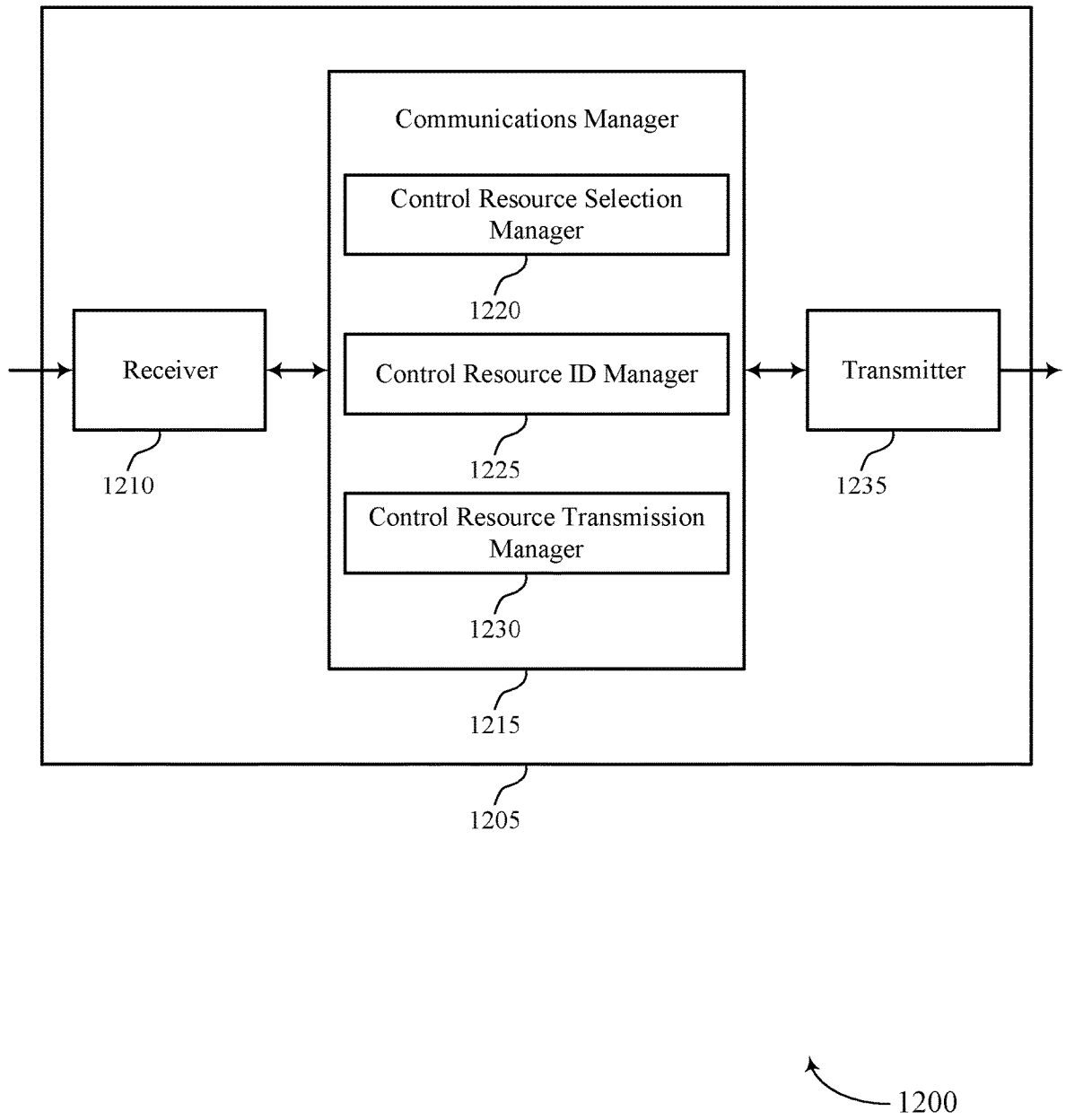

FIG. 12 shows a block diagram 1200 of a device 1205 that supports overbooking handling for multiple transceiver nodes in accordance with aspects of the present disclosure. The device 1205 may be an example of aspects of a device 1105 or a base station 105 as described herein. The device 1205 may include a receiver 1210, a communications manager 1215, and a transmitter 1235. The device 1205 may also include a processor. Each of these components may be in communication with one another (e.g., via one or more buses).

The receiver 1210 may receive information such as packets, user data, or control information associated with various information channels (e.g., control channels, data channels, and information related to overbooking handling for multiple transceiver nodes, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a control resource selection manager 1220, a control resource ID manager 1225, and a control resource transmission manager 1230. The communications manager 1215 may be an example of aspects of the communications manager 1410 described herein.

The control resource selection manager 1220 may identify a set of control resources configured for a UE.

The control resource ID manager 1225 may configure an identifier for each control resource in the set of resources based on a number of transceiver nodes transmitting control resources to the UE.

The control resource transmission manager 1230 may transmit a set of control signals to the UE using the control resources in the set of control resources, each control resource transmitted in an order corresponding to the identifier.

The transmitter 1235 may transmit signals generated by other components of the device 1205. In some examples, the transmitter 1235 may be collocated with a receiver 1210 in a transceiver module. For example, the transmitter 1235 may be an example of aspects of the transceiver 1420 described with reference to FIG. 14. The transmitter 1235 may utilize a single antenna or a set of antennas.

Figure 13:
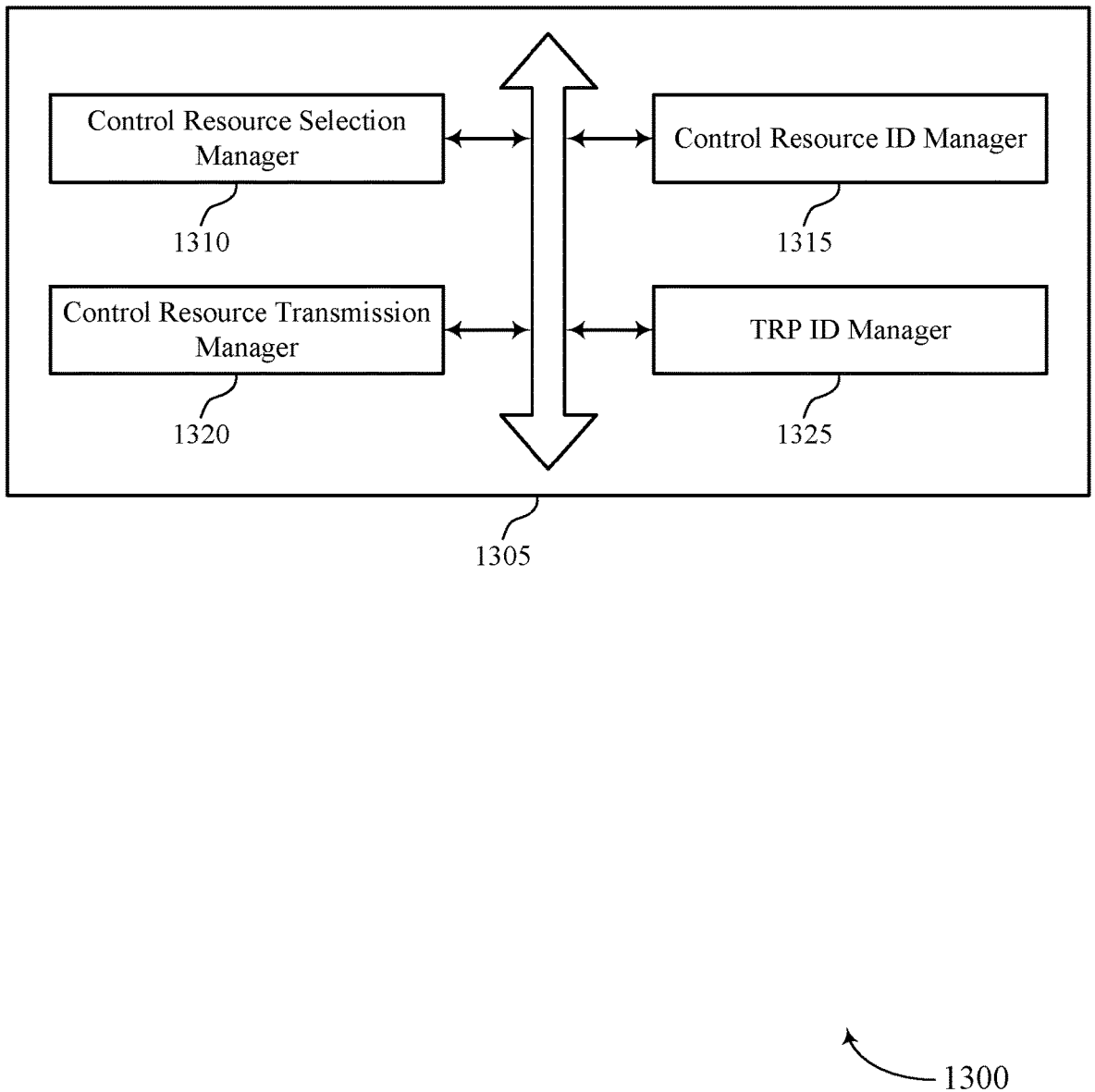
FIG. 13 shows a block diagram of a communications manager that supports overbooking handling for multiple transceiver nodes in accordance with aspects of the present disclosure.

FIG. 13 shows a block diagram 1300 of a communications manager 1305 that supports overbooking handling for multiple transceiver nodes in accordance with aspects of the present disclosure. The communications manager 1305 may be an example of aspects of a communications manager 1115, a communications manager 1215, or a communications manager 1410 described herein. The communications manager 1305 may include a control resource selection manager 1310, a control resource ID manager 1315, a control resource transmission manager 1320, and a TRP ID manager 1325. Each of these modules may communicate, directly or indirectly, with one another (e.g., via one or more buses).

The control resource selection manager 1310 may identify a set of control resources configured for a UE.

The control resource ID manager 1315 may configure an identifier for each control resource in the set of resources based on a number of transceiver nodes transmitting control resources to the UE. In some examples, the control resource ID manager 1315 may configure the identifier for each control resource using a non-consecutive order. In some examples, the control resource ID manager 1315 may configure the identifier for each control resource using a consecutive order.

The control resource transmission manager 1320 may transmit a set of control signals to the UE using the control resources in the set of control resources, each control resource transmitted in an order corresponding to the identifier.

The TRP ID manager 1325 may configure the identifier for each control resource based on an identifier associated with the transceiver node. The TRP ID manager 1325 may coordinate with at least one of an adjacent transceiver node of the number of transceiver nodes, a network controller entity, or a combination thereof.

Figure 14:
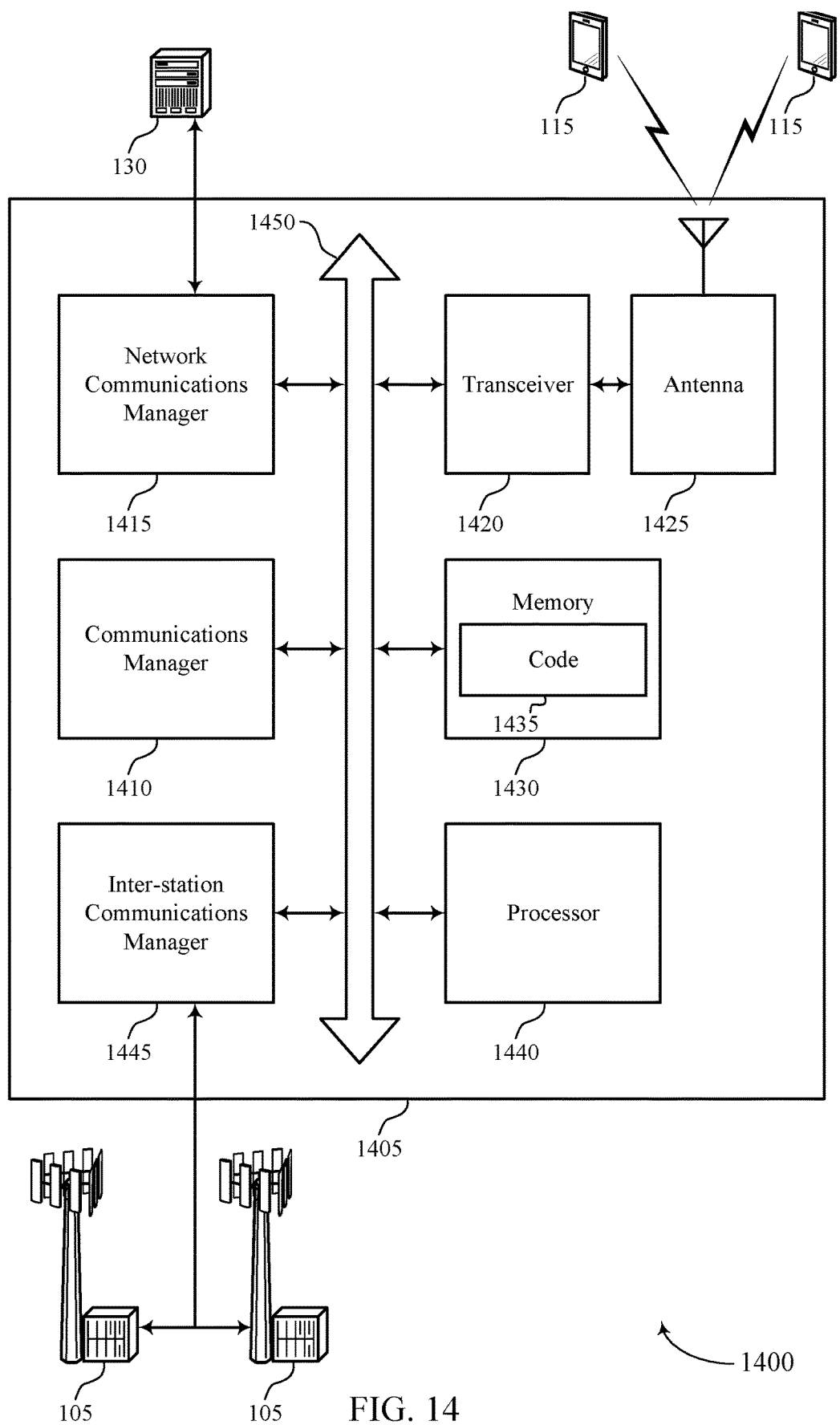
FIG. 14 shows a diagram of a system including a device that supports overbooking handling for multiple transceiver nodes in accordance with aspects of the present disclosure.

FIG. 14 shows a diagram of a system 1400 including a device 1405 that supports overbooking handling for multiple transceiver nodes in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may identify a set of control resources configured for a UE, configure an identifier for each control resource in the set of resources based on a number of transceiver nodes transmitting control resources to the UE, and transmit a set of control signals to the UE using the control resources in the set of control resources, each control resource transmitted in an order corresponding to the identifier.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device #{device} to perform various functions (e.g., functions or tasks supporting overbooking handling for multiple transceiver nodes).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
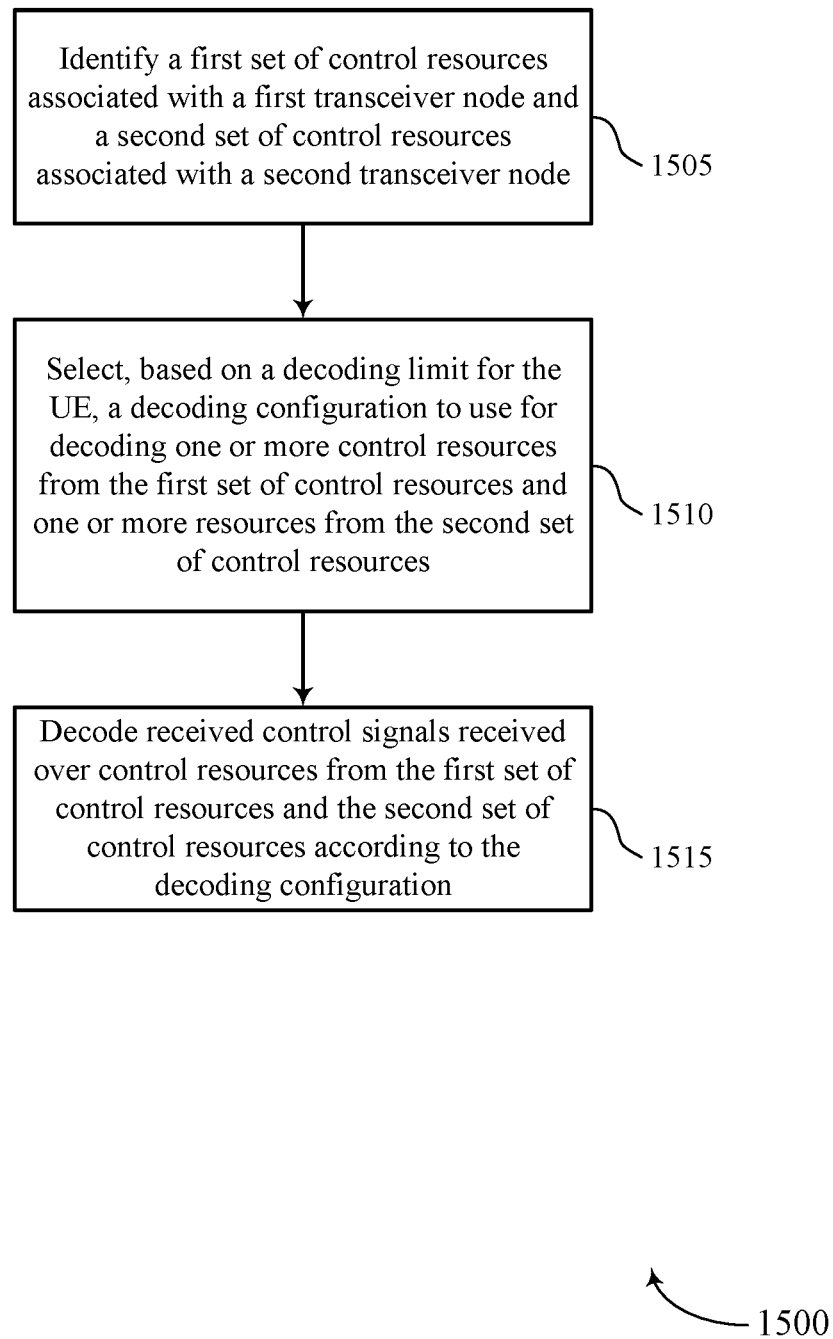
FIGS. 15 through 17 show flowcharts illustrating methods that support overbooking handling for multiple transceiver nodes in accordance with aspects of the present disclosure.

FIG. 15 shows a flowchart illustrating a method 1500 that supports overbooking handling for multiple transceiver nodes in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may identify a first set of control resources associated with a first transceiver node and a second set of control resources associated with a second transceiver node. The operations of 1505 may be performed according to the methods described herein. In some examples, aspects of the operations of 1505 may be performed by a control resource identifier as described with reference to FIGS. 7 through 10.

At 1510, the UE may select, based on a decoding limit for the UE, a decoding configuration to use for decoding one or more control resources from the first set of control resources and one or more resources from the second set of control resources. The operations of 1510 may be performed according to the methods described herein. In some examples, aspects of the operations of 1510 may be performed by a decoding configuration manager as described with reference to FIGS. 7 through 10.

At 1515, the UE may decode received control signals received over control resources from the first set of control resources and the second set of control resources according to the decoding configuration. The operations of 1515 may be performed according to the methods described herein. In some examples, aspects of the operations of 1515 may be performed by a decoding manager as described with reference to FIGS. 7 through 10.

Figure 16:
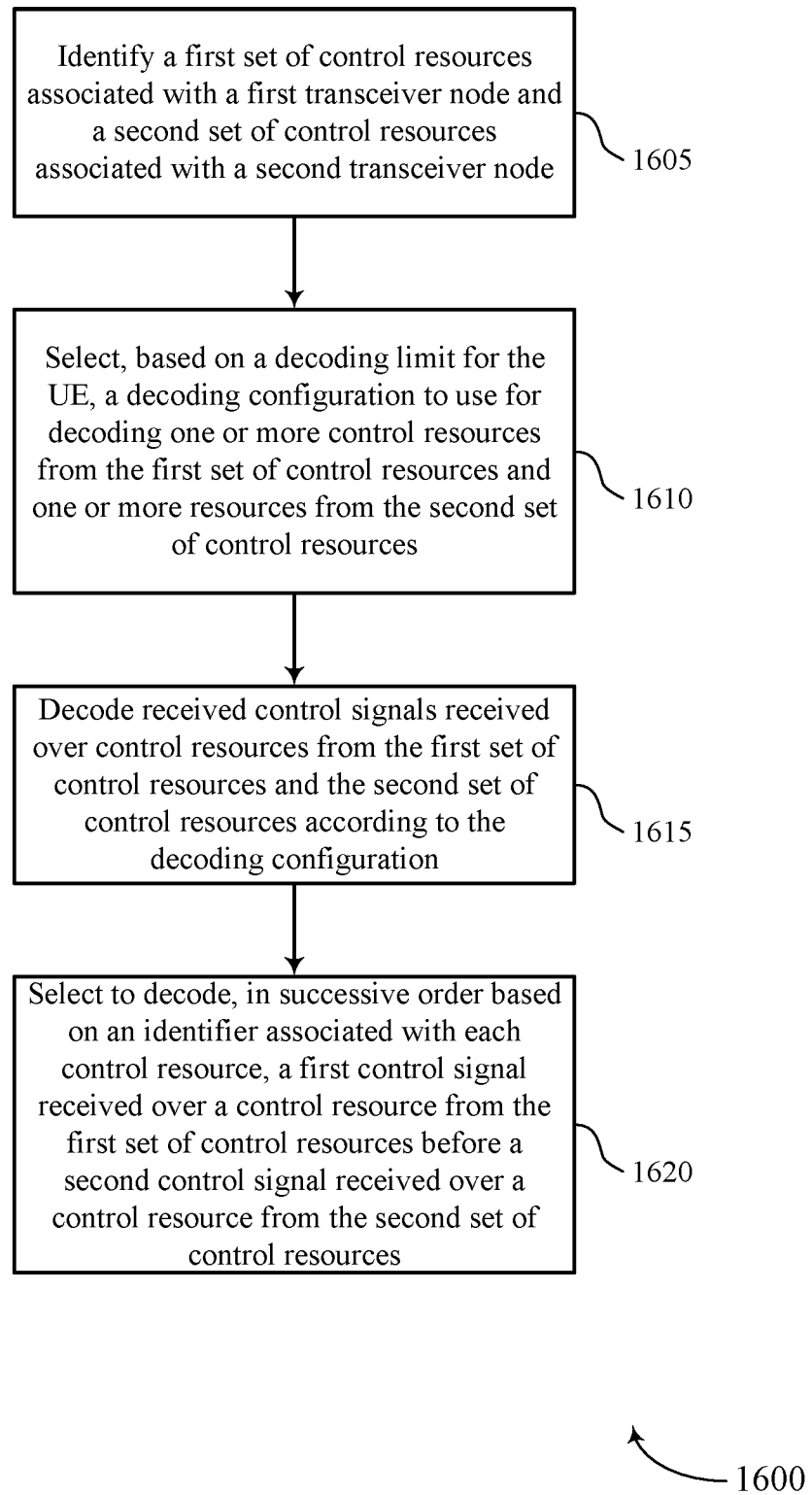

FIG. 16 shows a flowchart illustrating a method 1600 that supports overbooking handling for multiple transceiver nodes in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1605, the UE may identify a first set of control resources associated with a first transceiver node and a second set of control resources associated with a second transceiver node. The operations of 1605 may be performed according to the methods described herein. In some examples, aspects of the operations of 1605 may be performed by a control resource identifier as described with reference to FIGS. 7 through 10.

At 1610, the UE may select, based on a decoding limit for the UE, a decoding configuration to use for decoding one or more control resources from the first set of control resources and one or more resources from the second set of control resources. The operations of 1610 may be performed according to the methods described herein. In some examples, aspects of the operations of 1610 may be performed by a decoding configuration manager as described with reference to FIGS. 7 through 10.

At 1615, the UE may decode received control signals received over control resources from the first set of control resources and the second set of control resources according to the decoding configuration. The operations of 1615 may be performed according to the methods described herein. In some examples, aspects of the operations of 1615 may be performed by a decoding manager as described with reference to FIGS. 7 through 10.

At 1620, the UE may select to decode, in successive order based on an identifier associated with each control resource, first control signals received over a first control resource from the first set of control resources before second control signals received over a second control resource from the second set of control resources. The operations of 1620 may be performed according to the methods described herein. In some examples, aspects of the operations of 1620 may be performed by a control resource ID manager as described with reference to FIGS. 7 through 10.

Figure 17:
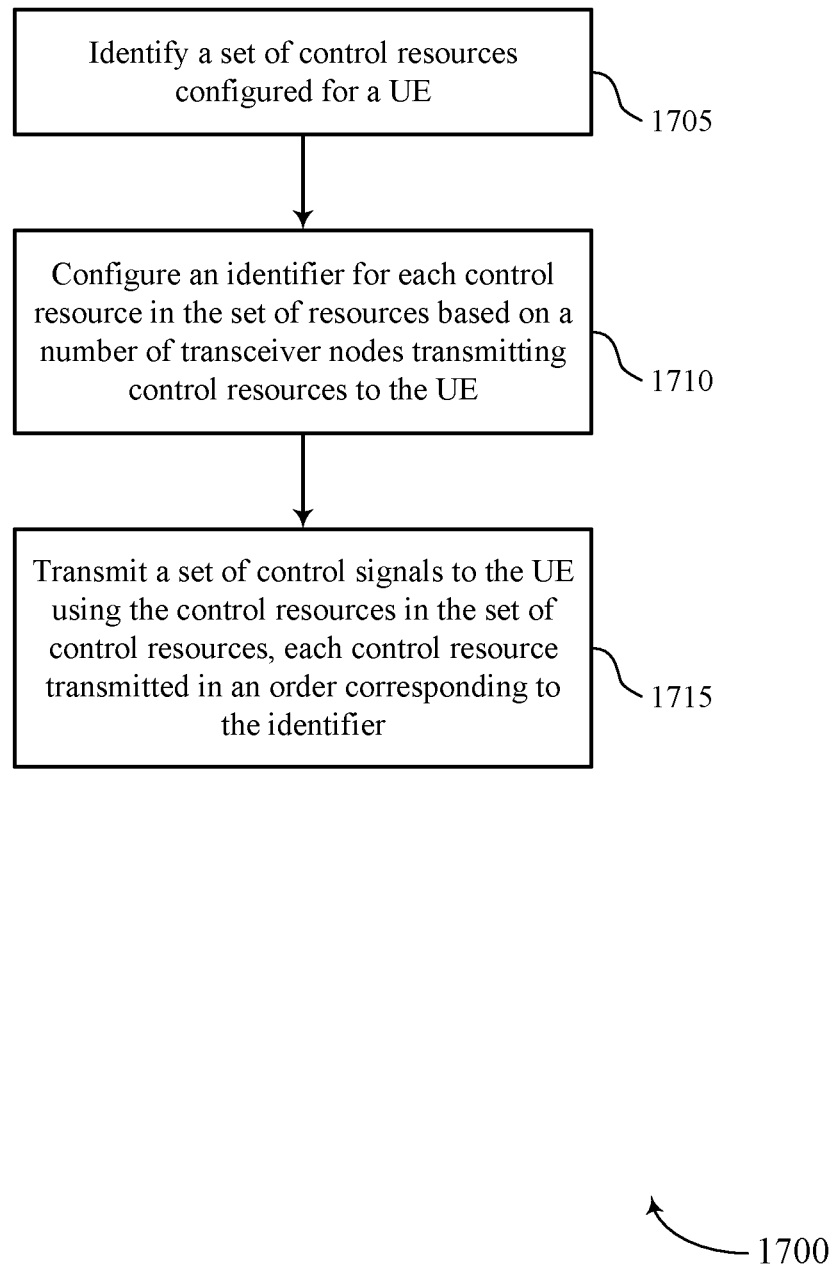

FIG. 17 shows a flowchart illustrating a method 1700 that supports overbooking handling for multiple transceiver nodes in accordance with aspects of the present disclosure. The operations of method 1700 may be implemented by a base station 105 or its components as described herein. For example, the operations of method 1700 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1705, the base station may identify a set of control resources configured for a UE. The operations of 1705 may be performed according to the methods described herein. In some examples, aspects of the operations of 1705 may be performed by a control resource selection manager as described with reference to FIGS. 11 through 14.

At 1710, the base station may configure an identifier for each control resource in the set of resources based on a number of transceiver nodes transmitting control resources to the UE. The operations of 1710 may be performed according to the methods described herein. In some examples, aspects of the operations of 1710 may be performed by a control resource ID manager as described with reference to FIGS. 11 through 14.

At 1715, the base station may transmit a set of control signals to the UE using the control resources in the set of control resources, each control resource transmitted in an order corresponding to the identifier. The operations of 1715 may be performed according to the methods described herein. In some examples, aspects of the operations of 1715 may be performed by a control resource transmission manager as described with reference to FIGS. 11 through 14.

It should be noted that the methods described above describe possible implementations, and that the operations and the steps may be rearranged or otherwise modified and that other implementations are possible. Further, aspects from two or more of the methods may be combined.

Aspects of the following examples may be combined with any of the previous embodiments or aspects described herein. Thus, example 1 is a method for wireless communication at a UE that includes: identifying a first plurality of control resources associated with a first transceiver node and a second plurality of control resources associated with a second transceiver node; selecting, based at least in part on a decoding limit for the UE, a decoding configuration to use for decoding one or more control resources from the first plurality of control resources and one or more resources from the second plurality of control resources; and decoding control signals received over control resources from the first plurality of control resources and the second plurality of control resources according to the decoding configuration.

In example 2 the method of example 1, may include the decoding configuration comprising the UE selecting to decode, in successive order based at least in part on an ID associated with each control resource, first control signals received over a first control resource from the first plurality of control resources before second control signals received over a second control resource from the second plurality of control resources.

In example 3 the method of examples 1-2, may include the control resources in the first plurality of control resources and the control resources in the second plurality of control resources comprising alternating IDs for each control resource.

In example 4 the method of examples 1-3, may include the decoding configuration comprising selecting to decode first control signals received over a first control resource of the first plurality of control resources; selecting to decode second control signals received over a second control resource of the second plurality of control resources; and repeating, based at least in part on the decoding limit, the decoding of control signals received over control resources from the first plurality of control resources followed by the decoding of control signals received over control resources from the second plurality of control resources.

In example 5 the method of examples 1-4, may include determining a first ID associated with the first transceiver node and a second ID associated with the second transceiver node, wherein decoding the first control signals and the second control signals is based at least in part on the first ID and the second ID.

In example 6 the method of examples 1-5, may include the decoding configuration comprising identifying a number of transceiver nodes communicating control signals to the UE; dividing, based at least in part on the decoding limit, the decoding limit among the transceiver nodes; and selecting, based at least in part on the dividing, to decode control signals received over control resources corresponding to each transceiver node.

In some aspects of example 6, the decoding limit of the UE may include a first decoding limit associated with the first transceiver node and a second decoding limit associated with the second transceiver node. In some aspects of example 6, summation of the first decoding limit and the second decoding limit may be no larger than the decoding limit for the UE when it communicates with a single transceiver node.

In example 7 the method of examples 1-6, may include receiving a signal from the first transceiver node indicating a first ID for the first transceiver node; and receiving a signal from the second transceiver node indicating a second ID for the second transceiver node.

In example 8 the method of examples 1-7, may include receiving a signal from a single transceiver node indicating a first ID for the first transceiver node and a second ID for the second transceiver node.

In example 9 the method of examples 1-8, may include receiving a signal from the first transceiver node indicating IDs for the control resources in the first plurality of control resources; and receiving a signal from the second transceiver node indicating IDs for the control resources in the second plurality of control resources.

In example 10 the method of examples 1-9, may include receiving a signal from a single transceiver node indicating IDs for the control resources in the first plurality of control resources and IDs for the control resources in the second plurality of control resources.

In example 11 the method of examples 1-10, may include the decoding limit being based on a number of blind decoding limits per slot or a number of CCEs for channel estimation per slot, e.g., per scheduling unit.

In example 12 the method of examples 1-11, may include the first transceiver node comprises a first TRP and the second transceiver node comprises a second TRP.

In example 13 the method of examples 1-12, may include each control resource in the first plurality of control resources and the second plurality of control resources comprising a search space set.

Example 14 is a method for wireless communication at a transceiver node, comprising: identifying a plurality of control resources configured for a UE; configuring an ID for each control resource in the plurality of resources based at least in part on a number of transceiver nodes transmitting control resources to the UE; and transmitting a plurality of control signals to the UE using the control resources in the plurality of control resources, each control resource transmitted in an order corresponding to the ID.

In example 15 the method of example 14, may include configuring the ID for each control resource using a non-consecutive order.

In example 16 the method of example 14-15, may include configuring the ID for each control resource using a consecutive order.

In example 17 the method of example 14-16, may include configuring the ID for each control resource based at least in part on an identifier associated with the transceiver node.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    selecting a decoding configuration to use for decoding one or more control resources from a first plurality of control resources associated with a first transceiver node and one or more resources from a second plurality of control resources associated with a second transceiver node, based at least in part on a decoding limit for the UE and alternating the one or more resources from the first plurality of control resources and the one or more resources from the second plurality of control resources; and
    decoding received control signals received over control resources from the first plurality of control resources and the second plurality of control resources according to the decoding configuration.

2. The method of claim 1, wherein the decoding configuration comprises:
    selecting to decode, in successive order based at least in part on an identifier associated with each control resource, first control signals received over a first control resource from the first plurality of control resources before second control signals received over a second control resource from the second plurality of control resources.

3. The method of claim 2, wherein the control resources in the first plurality of control resources and the control resources in the second plurality of control resources comprise alternating identifiers for each control resource.

4. The method of claim 1, wherein the decoding configuration comprises:
    selecting to decode first control signals received over a first control resource of the first plurality of control resources;
    selecting to decode second control signals received over a second control resource of the second plurality of control resources; and
    repeating, based at least in part on the decoding limit, the decoding of control signals received over control resources from the first plurality of control resources followed by the decoding of control signals received over control resources from the second plurality of control resources.

5. The method of claim 4, further comprising:
    determining a first identifier associated with the first transceiver node and a second identifier associated with the second transceiver node, wherein decoding the first control signals and the second control signals is based at least in part on the first identifier and the second identifier.

6. The method of claim 1, wherein the decoding configuration comprises:
    identifying a number of transceiver nodes communicating control signals to the UE;

dividing, based at least in part on the decoding limit, the decoding limit between the transceiver nodes; and selecting, based at least in part on the dividing, to decode control signals received over control resources corresponding to each transceiver node.

7. The method of claim 6, wherein the decoding limit of the UE comprise a first decoding limit associated with the first transceiver node and a second decoding limit associated with the second transceiver node.

8. The method of claim 1, further comprising:
receiving a signal from the first transceiver node indicating a first identifier for the first transceiver node; and
receiving a signal from the second transceiver node indicating a second identifier for the second transceiver node.

9. The method of claim 1, further comprising:
receiving a signal from a single transceiver node indicating a first identifier for the first transceiver node and a second identifier for the second transceiver node.

10. The method of claim 1, further comprising:
receiving a signal from the first transceiver node indicating identifiers for the control resources in the first plurality of control resources; and
receiving a signal from the second transceiver node indicating identifiers for the control resources in the second plurality of control resources.

11. The method of claim 1, further comprising:
receiving a signal from a single transceiver node indicating identifiers for the control resources in the first plurality of control resources and identifiers for the control resources in the second plurality of control resources.

12. The method of claim 1, wherein the decoding limit is based on a number of blind decoding limits per slot or a number of control channel elements (CCEs) for channel estimation per defined scheduling unit.

13. The method of claim 1, wherein the first transceiver node comprises a first transmission/reception point (TRP) and the second transceiver node comprises a second TRP.

14. The method of claim 1, wherein each control resource in the first plurality of control resources and the second plurality of control resources comprises a search space set.

15. An apparatus for wireless communication at a user equipment (UE), comprising:
a processor,
memory in electronic communication with the processor; and
instructions stored in the memory and executable by the processor to cause the apparatus to:
select a decoding configuration to use for decoding one or more control resources from a first plurality of control resources associated with a first transceiver node and one or more resources from a second plurality of control resources associated with a second transceiver node, based at least in part on a decoding limit for the UE and alternating the one or more resources from the first plurality of control resources and the one or more resources from the second plurality of control resources; and
decode received control signals received over control resources from the first plurality of control resources and the second plurality of control resources according to the decoding configuration.

16. The apparatus of claim 15, wherein the instructions executable by the processor to cause the apparatus to select the decoding configuration comprise instructions executable by the processor to cause the apparatus to:
select to decode, in successive order based at least in part on an identifier associated with each control resource, first control signals received over a first control resource from the first plurality of control resources before second control signals received over a second control resource from the second plurality of control resources.

17. The apparatus of claim 16, wherein the control resources in the first plurality of control resources and the control resources in the second plurality of control resources comprise alternating identifiers for each control resource.

18. The apparatus of claim 15, wherein the instructions executable by the processor to cause the apparatus to select the decoding configuration comprise instructions executable by the processor to cause the apparatus to:
select to decode first control signals received over a first control resource of the first plurality of control resources;
select to decode second control signals received over a second control resource of the second plurality of control resources; and
repeat, based at least in part on the decoding limit, the decoding of control signals received over control resources from the first plurality of control resources followed by the decoding of control signals received over control resources from the second plurality of control resources.

19. The apparatus of claim 18, wherein the instructions are further executable by the processor to cause the apparatus to:
determine a first identifier associated with the first transceiver node and a second identifier associated with the second transceiver node, wherein decoding the first control signals and the second control signals is based at least in part on the first identifier and the second identifier.

20. The apparatus of claim 15, wherein the instructions executable by the processor to cause the apparatus to select the decoding configuration comprise instructions executable by the processor to cause the apparatus to:
identify a number of transceiver nodes communicating control signals to the UE;
divide, based at least in part on the decoding limit, the decoding limit between the transceiver nodes; and
select, based at least in part on the dividing, to decode control signals received over control resources corresponding to each transceiver node.

21. The apparatus of claim 15, wherein the instructions are further executable by the processor to cause the apparatus to:
receive a signal from the first transceiver node indicating a first identifier for the first transceiver node; and
receive a signal from the second transceiver node indicating a second identifier for the second transceiver node.

22. The apparatus of claim 15, wherein the instructions are further executable by the processor to cause the apparatus to:
receive a signal from a single transceiver node indicating a first identifier for the first transceiver node and a second identifier for the second transceiver node.

* * * * *